US012228094B2

(12) United States Patent
Mook et al.

(10) Patent No.: US 12,228,094 B2
(45) Date of Patent: Feb. 18, 2025

(54) SYSTEM AND APPARATUS FOR ENERGY CONVERSION

(71) Applicant: HYLIION HOLDINGS CORP, Cedar Park, TX (US)

(72) Inventors: Joshua Tyler Mook, Loveland, OH (US); Michael Thomas Gansler, Mason, OH (US); Scott Douglas Waun, Loveland, OH (US); Kevin Michael VandeVoorde, Cincinnati, OH (US); Aigbedion Akwara, Cincinnati, OH (US); Michael Robert Notarnicola, Cincinnati, OH (US); Jason Joseph Bellardi, Fairfield, OH (US); Mohammed El Hacin Sennoun, West Chester, OH (US); Mohamed Osama, Garching (DE)

(73) Assignee: HYLIION HOLDINGS CORP, Cedar Park, TX (US)

( * ) Notice: Subject to any disclaimer, the term of this patent is extended or adjusted under 35 U.S.C. 154(b) by 0 days.

(21) Appl. No.: 16/920,821

(22) Filed: Jul. 6, 2020

(65) Prior Publication Data

US 2022/0213847 A1 Jul. 7, 2022

Related U.S. Application Data

(63) Continuation of application No. 16/418,129, filed on May 21, 2019, now Pat. No. 10,724,470.

(51) Int. Cl.
*F02G 1/055* (2006.01)
*F02G 1/043* (2006.01)
(Continued)

(52) U.S. Cl.
CPC .......... *F02G 1/055* (2013.01); *F02G 1/0435* (2013.01); *F02G 1/044* (2013.01); *F02G 1/057* (2013.01);
(Continued)

(58) Field of Classification Search
CPC ........ F02G 1/043; F02G 1/0435; F02G 1/044; F02G 1/055; F02G 2243/20;
(Continued)

(56) References Cited

U.S. PATENT DOCUMENTS 3,296,808 A 1/1967 Malik
3,552,120 A 1/1971 Beale
(Continued)

FOREIGN PATENT DOCUMENTS

DE 3237841 A1 4/1984
JP S6019950 A 2/1985
(Continued)

OTHER PUBLICATIONS

American Stirling Company, Regenerators, 10 Pages. https://www.stirlingengine.com/regenerators/.
(Continued)

*Primary Examiner* — Mark A Laurenzi
*Assistant Examiner* — Xiaoting Hu
(74) *Attorney, Agent, or Firm* — Dority & Manning, P.A.

(57) ABSTRACT

A system for energy conversion including a closed cycle engine containing a volume of working fluid is provided. The engine includes a double-ended piston assembly including a pair of pistons coupled to a connection member. An expansion chamber is separated from a compression chamber by the piston. The engine defines an outer end and an inner end relative to a lateral extension of the piston assembly. A heater body is positioned thermally proximal to the expansion chamber and thermally distal to the compression
(Continued)

chamber, and the heater body is positioned at the outer end of the engine. A load device is operably coupled to the piston assembly at the inner end of the engine. The load device is positioned between the pair of pistons of the piston assembly.

19 Claims, 18 Drawing Sheets

(51) Int. Cl.
*F02G 1/044* (2006.01)
*F02G 1/057* (2006.01)

(52) U.S. Cl.
CPC ...... *F02G 2244/52* (2013.01); *F02G 2255/00* (2013.01); *F02G 2256/04* (2013.01); *F02G 2256/50* (2013.01); *F02G 2270/40* (2013.01); *F02G 2280/10* (2013.01)

(58) Field of Classification Search
CPC ......... F02G 2243/202; F02G 2243/204; F02G 2243/206; F02G 2244/50; F02G 2244/52; F02G 2244/54; F02G 2280/10; F02G 2256/00; F02G 2256/04; F02G 2256/50; F02G 2254/00; F02G 2254/50; F02G 2255/00; F02G 1/057; F02G 2257/00; F02G 2257/02
See application file for complete search history.

(56) References Cited

U.S. PATENT DOCUMENTS 3,777,718 A 12/1973 Pattas
3,834,455 A 9/1974 Hakansson
3,991,457 A 11/1976 Barton
4,026,114 A 5/1977 Belaire
4,030,297 A 6/1977 Kantz et al.
4,077,216 A 3/1978 Cooke-Yarborough
4,183,214 A 1/1980 Beale et al.
4,199,945 A * 4/1980 Finkelstein ........... F02G 1/0435 60/520
4,387,568 A 6/1983 Dineen
4,389,844 A * 6/1983 Ackermann ............ F02G 1/044 60/517
4,498,298 A * 2/1985 Morgan ................ F02G 1/0435 60/517
4,545,738 A 10/1985 Young
4,644,851 A 2/1987 Young
4,662,176 A * 5/1987 Fujiwara ................. F02G 1/053 60/517
4,717,405 A 1/1988 Budliger
4,723,411 A 2/1988 Darooka et al.
4,815,291 A * 3/1989 Carlqvist .............. F02G 1/0435 60/520
5,056,316 A * 10/1991 Chung ...................... F23C 7/06 62/3.2
5,172,784 A * 12/1992 Varela, Jr. ............... B60L 50/62 180/65.265
6,293,101 B1 * 9/2001 Conrad ................. F02G 1/0435 60/524
7,134,279 B2 11/2006 White et al.
7,171,811 B1 * 2/2007 Berchowitz ............. F02G 1/044 60/517
8,720,198 B2 5/2014 Wood
8,820,068 B2 9/2014 Dadd
9,689,344 B1 6/2017 Gedeon
2003/0163990 A1 9/2003 Maceda et al.
2006/0179835 A1 * 8/2006 Qiu ......................... F28D 17/02 60/521
2008/0314356 A1 * 12/2008 Kamen .................... F16J 15/52 123/197.3
2011/0030366 A1 2/2011 Liu
2012/0012289 A1 1/2012 Martin
2012/0159943 A1 6/2012 Steiner et al.
2013/0233526 A1 9/2013 Hislop
2014/0353891 A1 12/2014 Wood
2015/0052887 A1 2/2015 Dadd
2015/0096298 A1 4/2015 Benn et al.
2015/0184614 A1 7/2015 Langenfeld et al.

FOREIGN PATENT DOCUMENTS

WO WO92/18346 A1 10/1992
WO WO2012032231 A1 5/2012

OTHER PUBLICATIONS

Bin-Nun et al., Low Cost and High Performance Screen Laminate Regenerator Matrix, ScienceDirect, FLIR Systems, MA, vol. 44, Issues 6-8, Jun.-Aug. 2004, pp. 439-444. https://www.sciencedirect.com/science/article/abs/pii/S0011227504000700.

Bright Hub Engineering, Oil Piston Cooling, Oct. 19, 2009, 6 Pages. https://www.brighthuben gineering.com/marine-engines-machinery/52783-how-are-marine-pistons-cooled-with-oil/.

Conner, 3D Printed Stirling Engine, Solar Heat Engines, Simulate, Analyze, Design, Build, and Test Solar-Powered Engines, Oct. 29, 2012, 12 Pages. http:/www.solarheatengines.com/2012/10/29/3d-printed-stirling-engine/.

Conner, A Regenerator for the 3D Printed PE 2 Stirling Engine, Solar Heat Engines, Simulate, Analyze, Design, Build, and Test Solar-Powered Engines, Dec. 18, 2012, 9 Pages. http://www.solarheatengines.com/2012/12/18/a-regenemtor-for-the-3d-printed-pe-2-stirling-engine/.

Deetlefs, Design, Simulation, Manufacture and Testing of a Free-Piston Stirling Engine, Thesis, Department of Mechatronic Engineering Stellenbosch University, Scholar Sun, South Africa, Dec. 2014, 138 Pages. https://scholar.sun.ac.za/bitstream/bandle/10019.1/95922/deetlefs_design_2014.pdf?sequence=3&isAllowed=y.

Defense Visual Information Distribution Service (DVIDS), MOD II Automotive Stirling Engine, NASA, C-1986-3706, Washington, DC, 2 pages. https://www.dvidshub. net/image/844058/mod-ii-automotive-stirling-engine.

Defense Visual Information Distribution Service (DVIDS), MOD II Automotive Stirling Engine, NASA, C-1986-3724, Washington, DC, 2 pages. https://www.dvidshub.net/image/841262/mod-ii-automotive-stirling-engine.

Defense Visual Information Distribution Service (DVIDS), MOD II Automotive Stirling Engine, NASA, C-1986-3725, Washington, DC, 2 pages. https://www.dvidshub.net/image/759360/mod-ii-automotive-sterling-engine.

Devitt, Restriction and Compensation of Gas Bearings—Bently Bearings by Newway, Aston, PA, 5 Pages. https://bentlybearings.com/restriction-and-compensation/.

Dudareva et al., Thermal Protection of Internal Combustion Engines Pistols, Science Direct, Procedia Engineering, vol. 206, 2017, pp. 1382-1387. https://www.sciencedirect.com/science/article/pii/S1877705817353341.

Electropaedia, Battery and Energy Technologies, Energy Conversion and Heat Engines, Woodbank Communications Ltd., Chester, United Kingdom, 2005, 11 Pages. https://www.mpoweruk.com/heat_engines.htm.

Elizondo-Luna, Investigation of Porous Metals as Improved Efficiency Regenerators, The University of Sheffield, Doctor of Philosophy Thesis, Mar. 2016, 261 Pages. http://etheses.whiterose.ac.uk/13111/1/Thesis%20Elizondo-Luna.pdf.

Enerlyt Stirling Engine, Enerlyt, Glowing-Isothermal-Mechanical-Stirling-Arranged-Motor, Enerlyt Technik GmbH, Potsdam, 2012, 13 Pages. http://www.enerlyt.de/english/pdf/en_motorbeschreibung_040413.pdf.

Engine Piston, GIF shared on GIPHY, 1 Page. https://giphy.com/gifs/engine-hybrid-piston-10YvqVUCHx2HC.

Fouzi, Chapter 6: Piston and Piston Rings, DJA3032 Internal Combustion Engine, Politeknik Malaysia, 201, 5 Pages. https://www.slideshare.net/mechanical86/dja3032-chapter-6.

(56) References Cited

OTHER PUBLICATIONS

Free-Piston Engine Range Extender Technology, Sir Joseph Swan Centre for Energy Research, 2016. (Video) https://www.youtube.com/watch?v=u4b0_6byuFU.
Garcia-Santamaria et al., A German Inverse Woodpile Structure with a Large Photonic Band Gap, Advanced Materials Communication, Wiley InterScience, 2007, Adv. Mater. 0000, 00, pp. 1-5. http://colloids.matse.illinois.edu/articles/garcia_advmat_2007.pdf.
General Electric—GE Power, Breaking the Power Plant Efficiency Record, 2016, 4 Pages. https://www.ge.com/power/about/insights/articles/2016/04/power-plant-efficiency-record.
Georgescu, Rotary Engine, 2007. (Video) https://www.youtube.com/watch?v=ckuQugFH680.
Gibson, et al., Cellular Solids Structure and Properties, Cambridge University Press, 2nd Edition, 1997. (Web Link) https://doi.org/10.1017/CBO9781139878326.
Green Car Congress, New Toroidal Internal Combustion Engine Promises 20:1 Power-to-Weight-Ratio Energy, Technologies, Issues and Polices for Sustainable Mobility, Apr. 2006, 2 Pages. https://www.greencarcongress.com/2006/04/new_toroidal_in.html.
Hoegel et al., Theoretical Investigation of the Performance of an Alpha Stirling Engine for Low Temperature Applications, Conference: ISEC 15th International Stirling Engine Conference, ResearchGate, New Zealand, Jan. 2012, 10 Pages. https://www.researchgate.net/publication/256706755_Theoretical_investigation_of_the_performance_of_an_Alpha_Stirling_engine_for_low_temperature_applications.
Honeywell Aerospace, Ultra Long-Life, Flight Qualified Technology for High Speed Imaging and Sensing Infra-Red Detectors, Stirling Cycle Cryocoolers, Auxiliary Power and Thermal, Honeywell Aerospace, 3 pages. https://aerospace.honeywell.com/en/products/auxiliary-power-and-thermal/stirling-cycle-cryocoolers.
Howden, Reciprocating Compressor C series—animation, Jun. 2017. (Video) https://www.youtube.com/watch?v=owNOdUBL37U&feature=youtu.be.
http://www.hybrid-engine-hope.com/media/pagini/95_0071d630dba777d16e9a770de27060e6.gif (Web Link).
Huang, Toroidal Engine Ver: 2.0, 2017. (Video) https://www.youtube.com/watch?v=n5L0Zc6Ic8Y&feature=youtu.be.
Ishikawa et al., Development of High Efficiency Gas Turbine Combined Cycle Power Plant, Power Systems Headquarters, Mitsubishi Heavy Industries, Ltd., Technical Review, vol. 45, No. 1, Mar. 2008, pp. 15-17. http://courses.me.metu.edu.tr/courses/me476/downloads/476s08ProjectPt4GtTemp.pdf.
Microgen Engine Corporation. Technology. (Web Link) https://www.microgen-engine.com/technology/technology/.
Murphy, IAV Sees Huge Potential With 3D-Printed Pistons, Wards Auto, Apr. 12, 2018, 6 Pages https://www.wardsauto.com/engines/jay-sees-huge-potential-3d-printed-pistons.
Ni et al., Improved Simple Analytical Model and Experimental Study of a 100 W B-Type Stirling Engine, Applied Energy, vol. 169, 2016, pp. 768-787. https://www.researchgate.net/publication/296632477_Improved_Simple_Analytical_Model_and_experimental_study_of_a_100W_b-type_Stirling_engine/figures?lo=.
Nightingale, Automotive Stirling Engine, Mod II Design Report, DOE/NASA/0032-28, NASA CR-175106, TI86ASE58SRI, New York, 1986, 54 Pages. https://ntrs.nasa.gov/archive/nasa/casi.ntrs.nasa.gov/19880002196.pdf.
O'Dell, SuperTruck Program Scores Big, Head into Second 5-Year Phase, Trucking.com, 2016, 7 Pages. https://www.trucks.com/2016/10/31/supertruck-program-5-year-phase/.
Owczarek, On the Design of Lubricant Free Piston Compressors, Nonlinear Solid Mechanics, Faculty of Engineering Technology, Thesis, University of Twente, Enschede, Sep. 17, 2010. (Abstract Only) https://research.utwente.nl/en/publications/on-the-design-of-lubricant-free-piston-compressors.
Panesar et al., Strategies for Functionally Graded Lattice Structures Derived Using Topology Optimisation for Additive Manufacturing, ScienceDirect, Additive Manufacturing, vol. 19, Jan. 2018, pp. 81-94. https://doi.org/10.1016/j.addma.2017.11.008.
Park et al., Thermal/Fluid Characteristics of Isotropic Plain-Weave Screen Laminates as Heat Exchange Surfaces, AIAA 2002-0208, 2002, pp. 1-9 https://wolfweb.unr.edu/~rawirtz/Papers/AIA.A2002-0208.pdf.
Penswick et al., Duplex Stirling Machines, Sunpower Incorporated 19th Annual Intersociety Energy Conversion Engineering Conference, QP051082-A, vol. 3, No. CONF-840804, United States, 1984, 7 Pages. https://www.ohio.edu/mechanical/stirling/engines/Duplex-Stirling-Machines.pdf.
Pneumatic Round Body Cylinder—SRG_SRG Series, Parker, Richland MI, 3 Pages. http://ph.parker.com/us/en/pneumatic-round-body-cylinder-srg-srgm-series.
Qiu et al., Advanced Stirling Power Generation System for CHP Application, ARPA, Temple University, Philadelphia, 5 Pages. https://arpa-e.energy.gov/sites/default/files/Temple_GENSETS_Kickoff.pdf.
Ranieri et al., Efficiency Reduction in Stirling Engines Resulting from Sinusoidal Motions, Energies, vol. 11, No. 11: 2887, 2018, 14 Pages. https://doi.org/10.3390/en11112887.
Renewable Energy, Double-Acting Stirling Engine, Stirling Engine, 1 Page. (Abstract Only) https://sites.google.com/a/emich.edu/cae546816t5/history/types/double-acting-stirling-engine.
Rodriguez Perez, Cellular Nanocomposites: A New Type of Light Weight Advanced Materials with Improved Properties, CellMat Technologies S.L. Transfer Center and Applied Technologies, Valladolid, 35 Pages. http://crono.obu.es/innovationh2020/pdf/cellmat.pdf.
Schonek, How big are power line losses?, Energy Management/Energy Efficiency, Schneider Electric, Mar. 25, 2013, 2 Pages. https://blog.schneider-electric.com/energy-management-energy-efficiency/2013/03/25/how-big-are-power-line-losses/.
Schwartz, The Natural Gas Heat Pump and Air Conditioner, 2014 Building Technologies Office Peer Review, ThermoLift, Inc., U.S. Department of Energy, Energy Efficiency & Renewable Energy, DE-FOA-0000823, 27 Pages (Refer to p. 7). https://www.energy.gov/sites/prod/files/2014/11/f19/BTO%202014%20Peer%20Review%20Presentation2%20-%20ThermoLift%204.4.14.pdf.
Shimizu, Next Prius Will Have Engine Thermal Efficiency of 40%, XTECH, Solar Plant Business, Nikkei Business Publications, May 22, 2015, 2 Pages. https://tech.nikkeibp.co.jp/dm/english/NEWS_EN/20150522/419560/.
Stirling Engines, Regenerators, What They Are and How They Work, American Stirling Company, 7 Pages. https://www.stidingengine.com/regenerators/.
Stirling Engines, Solar Cell Central, 3 Pages. http://solarcellce ral.com/stirling_page.html.
Technology, Microgen Engine Corporation, 2016, 4 Pages. https://www.microgen-engine.com/technology/technology/.
Thermolift, Technology—Background, The Thermodynamic Process Behind ThermoLift, ThermoLift, Inc., 3 Pages. http://www.tm-lift.com/background/.
Thimsen, Stirling Engine Assessment, 1007317, Electronic Power Research Institute (EPRI), Palo Alto, California, 2002, 170 Pages. http://www.engr.colostate.edu/~marchese/mech337-10/epri.pdf.
Thomassen, Free Floating Piston Film (mpeg).mpg, Mar. 5, 2010. (Video) https://www.youtube.com/watch?v=bHFUi0F0PgA.
Toptica Photonics, 2-Photon Polymerization, FemtoFiber Technology for Two-Photon Polymerization, 2 Pages. https://www.toptica.com/applications/ultrafast-studies/2-photon-polymerization/.
Toyota Motor Corporation, Inline 4 Cylinder 2.5L Injection Gasoline Engine/New Transaxle, Global Website, Dec. 6, 2016, 2 Pages. https://global.toyota/en/download/14447877/.
Tuncer et al., Structure-Property Relationship in Titanium Foams, Anadolu University, Turkey, Feb. 2011, 35 Pages. https://ocw.mit.edu/courses/materials-science-and-engineering/3-054-cellular-solids-structure-properties-and-applications-spring-2015/lecture-notes/MIT3_054S15_L13_Cellular.pdf.
Urieli, Chapter 5B—Regenerator Simple Analysis, Stirling Cycle Machine Analysis, Ohio Edu, Jan. 17, 2010, 5 Pages. https://www.ohio.edu/mechanical/stirling/simple/regen_simple.html.
Vodhanel, Characterization of Performance of a 3D Printed Stirling Engine Through Analysis and Test, Cleveland State University Engaged Scholarship@CSU, ETD Archive, 2016, 91 Pages. https://

(56) References Cited

OTHER PUBLICATIONS engagedscholarship.csuohio.edu/cgi/viewcontent.cei?referer=https://www.google.com/&httpsredir=1 &article=1944& context=etdarchive.
Wikipedia, Heat Engine, 8 Pages. https://en.wikipedia.org/wiki/Heat_engine.
Wikipedia, Regenerative Heat Exchanger, 3 Pages. https://en.wikipedia.org/wiki/Regenerative_heat_exchanger.
Wikipedia, Stirling Engine, 2019, 27 Pages. https://en.wikipedia.org/wiki/Stirling_engine.
Wirtz et al., High Performance Woven Mesh Heat Exchangers, Mechanical Engineering Department, University of Nevada, Reno, 2002, 8 Pages. https://apps.dtic.mil/dtic/tr/fulltext/u2/a408219.pdf.
Wirtz et al., Thermal/Fluid Characteristics of 3-D Woven Mesh Structures as Heat Exchanger Surfaces, IEEE Transactions on Components and Packaging Technologies, vol. 26, No. 1, Mar. 2003, pp. 40-47. https://pdfs.semanticscholar.org/d1a3/b4ce0baa639cf349d25d1506c3fa6118dc3e.pdf.
Wu et al., Model-based Analysis and Simulation of Regenerative Heat Wheel, ScienceDirect, Energy and Buildings, vol. 38, No. 5, May 2006, pp. 502-514. http://citeseerx.ist.psu.edu/viewdoc/download?doi=10.1.1.616.3103&.rep=repl&type=pdf.
Xie et al., Investigation on the Performances of the Gas Driven Vuilleumier Heat Pump, International Refrigeration and Air Conditioning Conference, Purdue University, School of Mechanical Engineering, 2008, 7 Pages. https://docs.lib.purdue.edu/cgi/viewcontent.cgi?referer=https://www.google.com/&httpsredir=1&article=1935&context=iracc.
European Search Report Corresponding to U.S. Appl. No. 23/184,858 on Nov. 6, 2023.

* cited by examiner

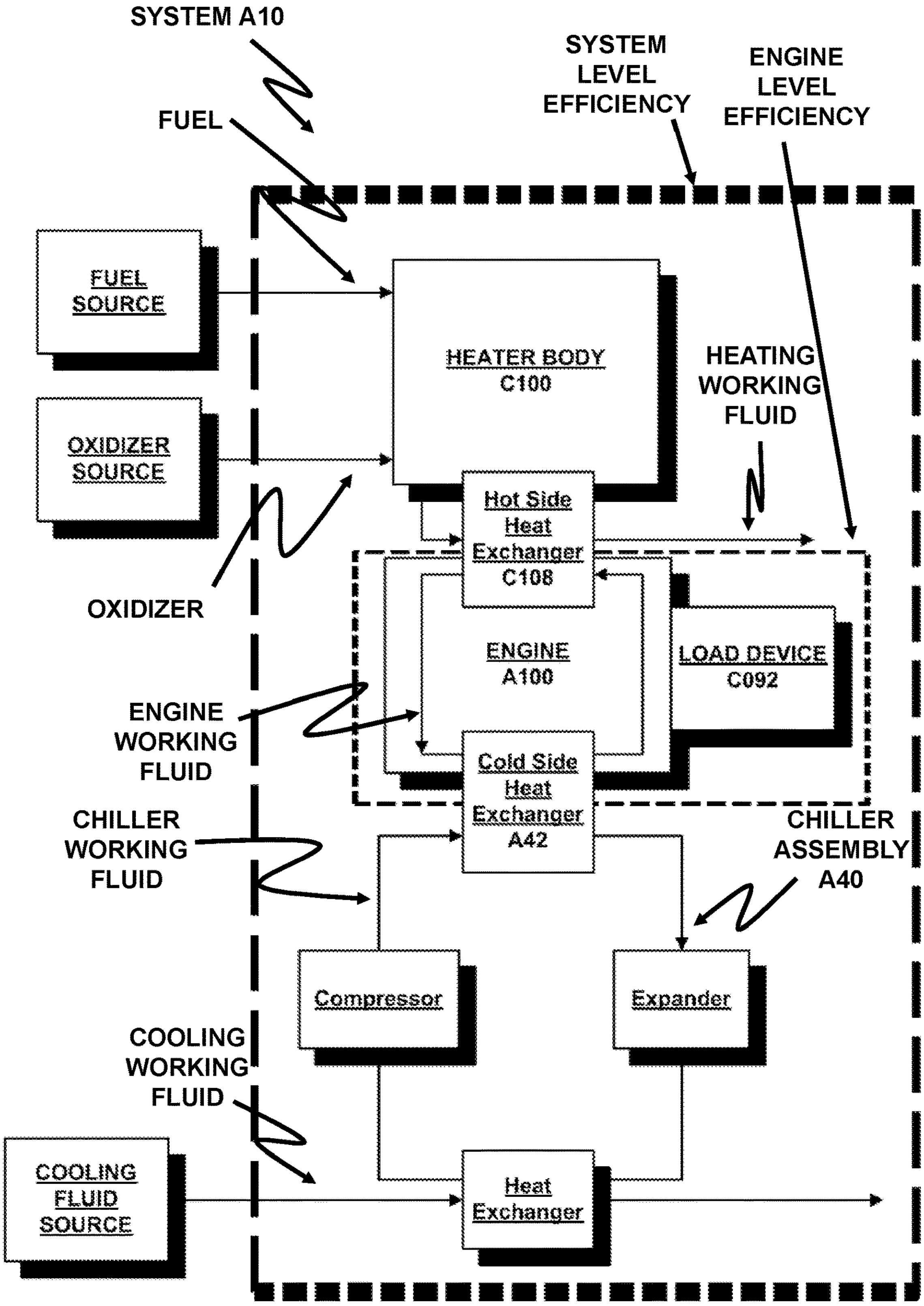
FIG. 1.2.1

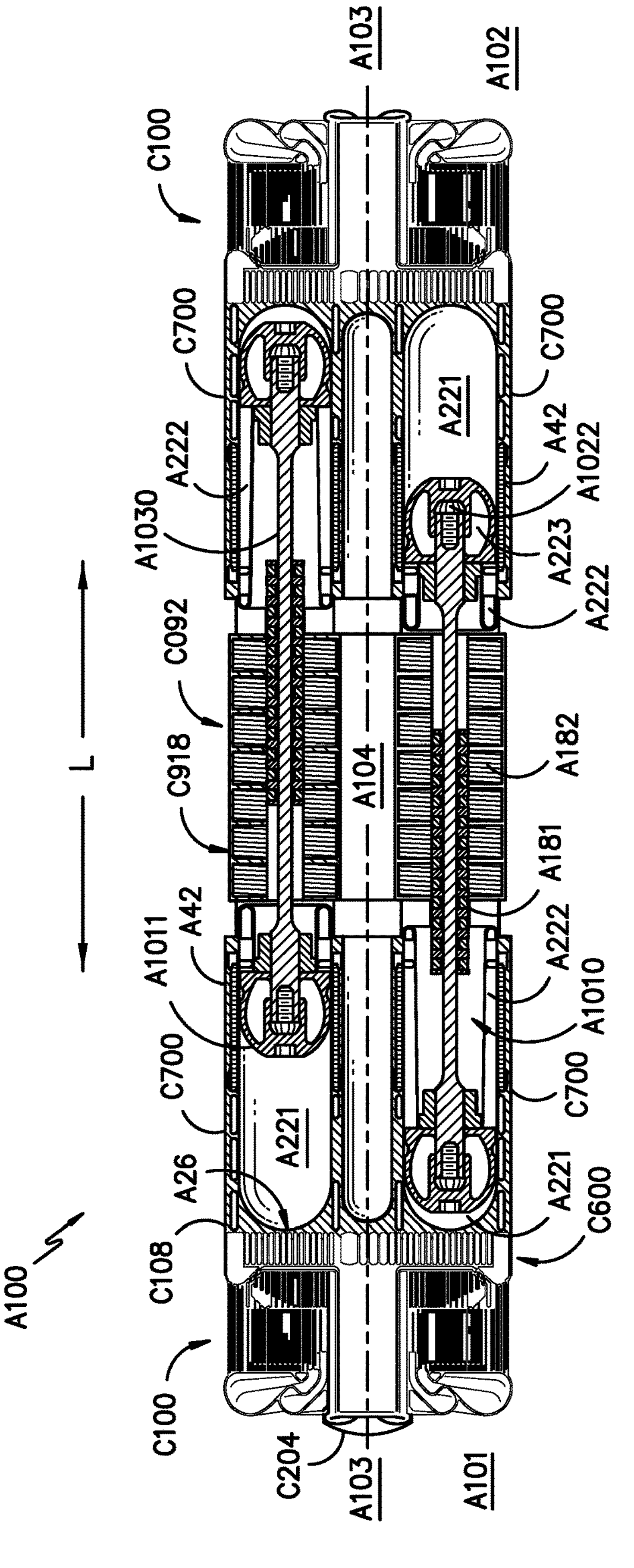
*FIG. 1.3.1*

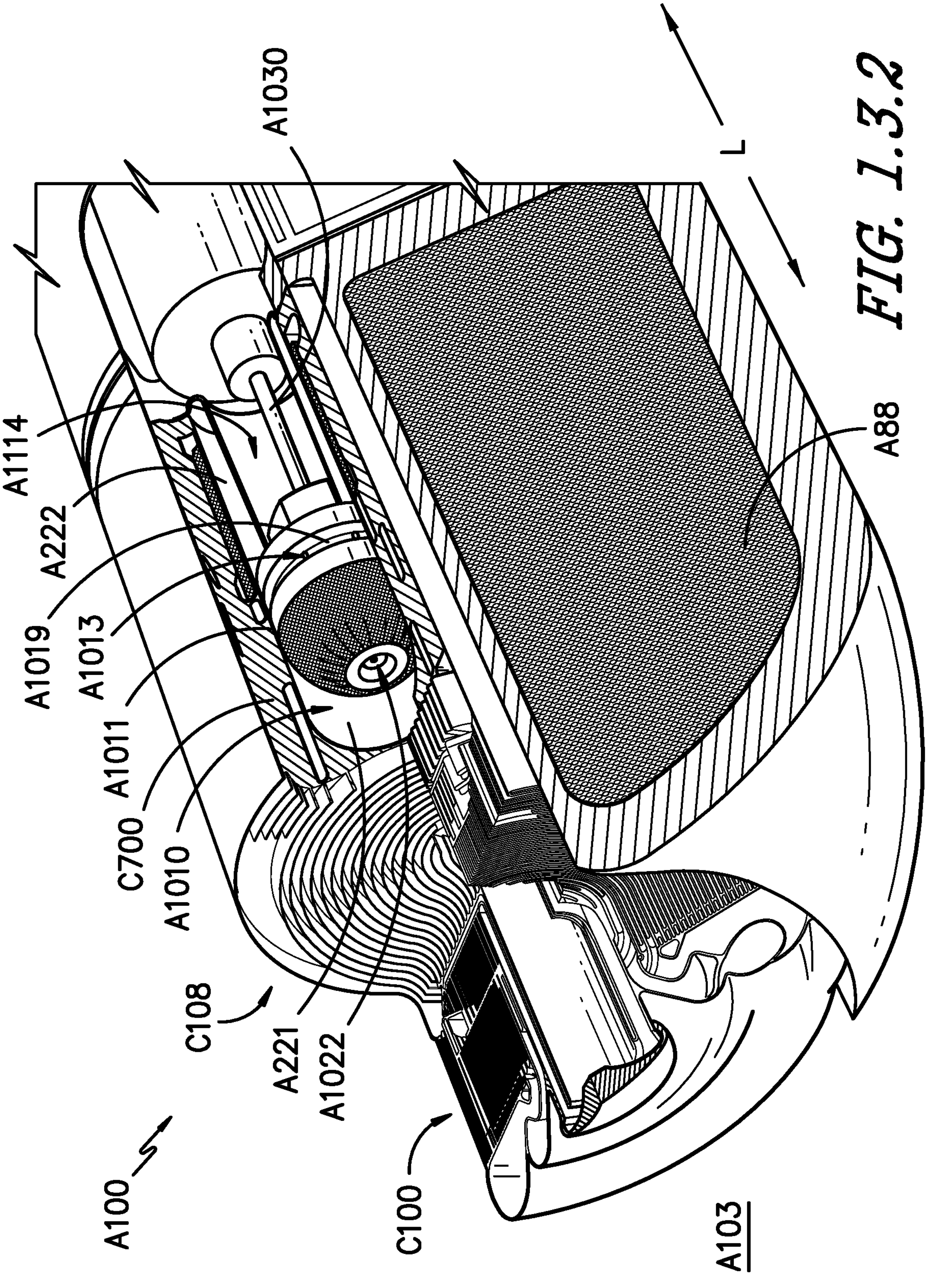
FIG. 1.3.2

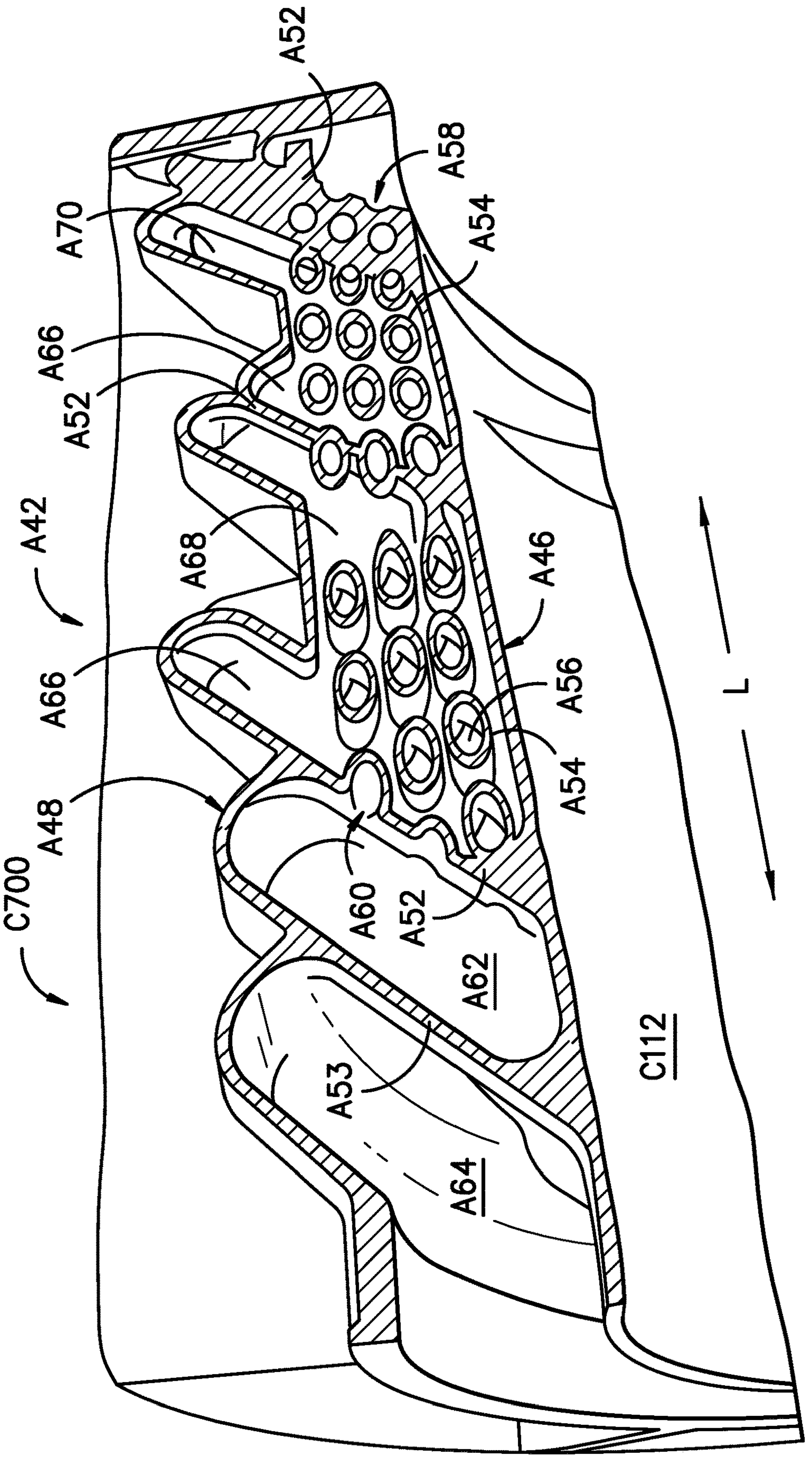
FIG. 1.4.1

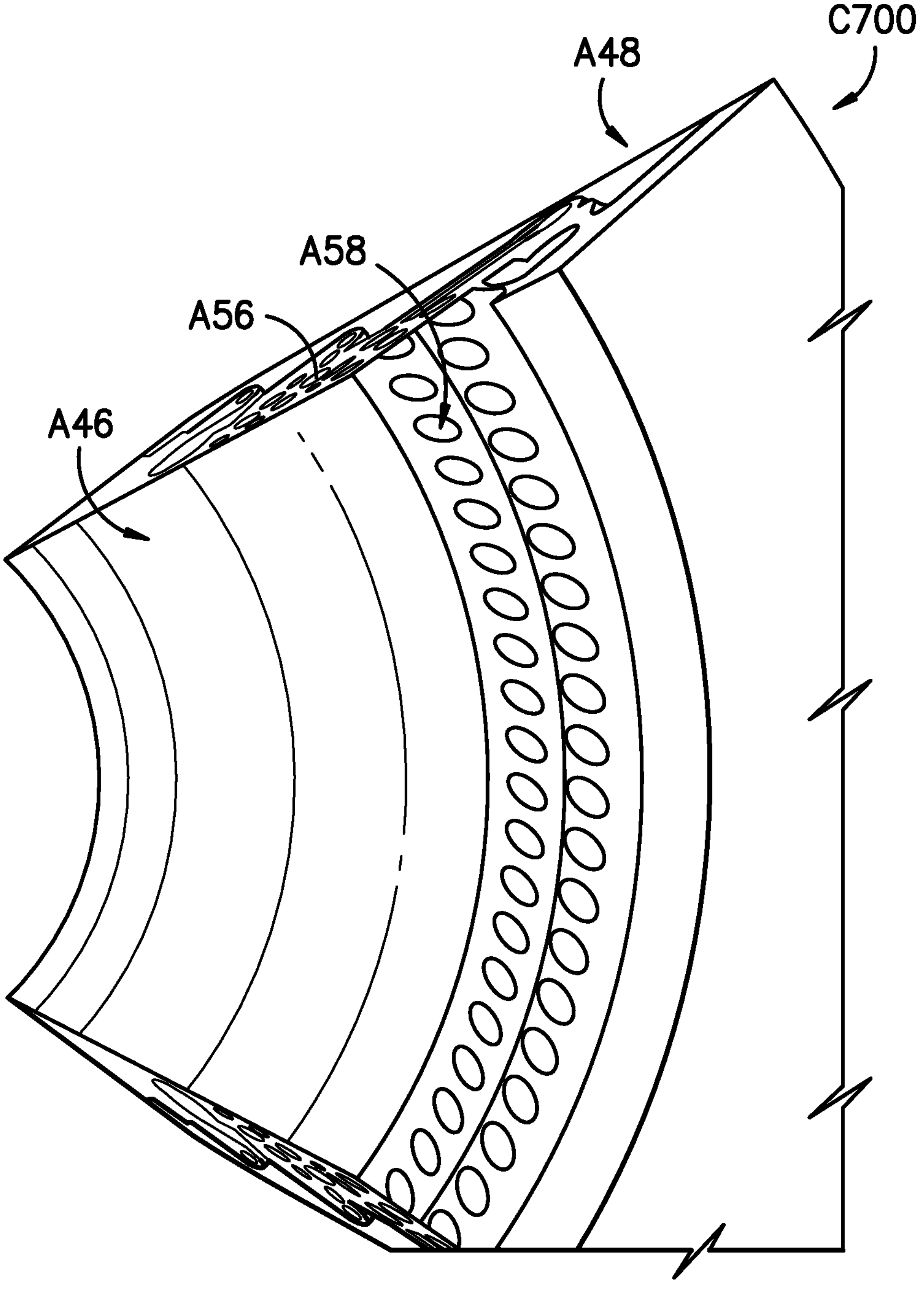
FIG. 1.4.2

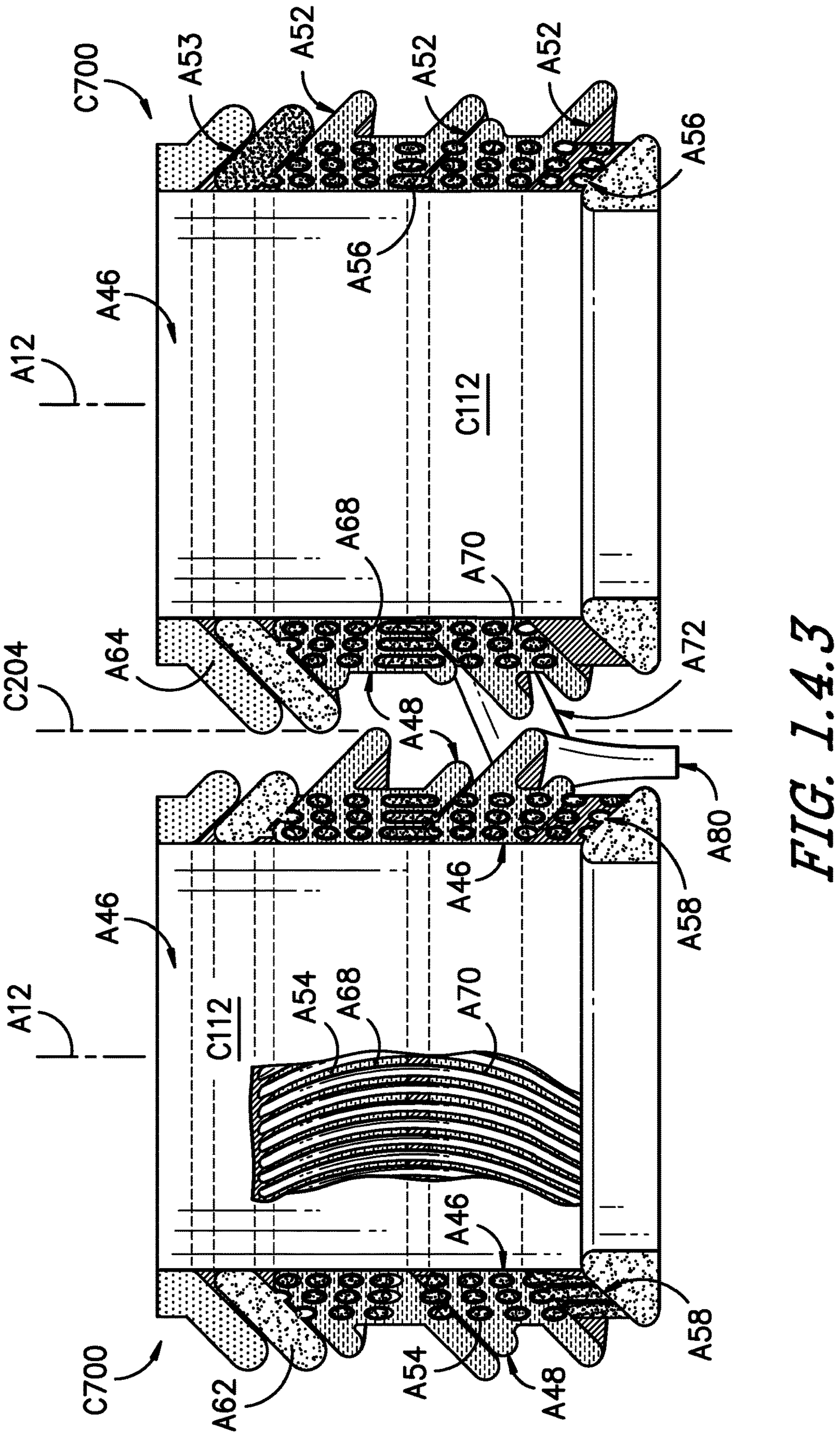
FIG. 1.4.3

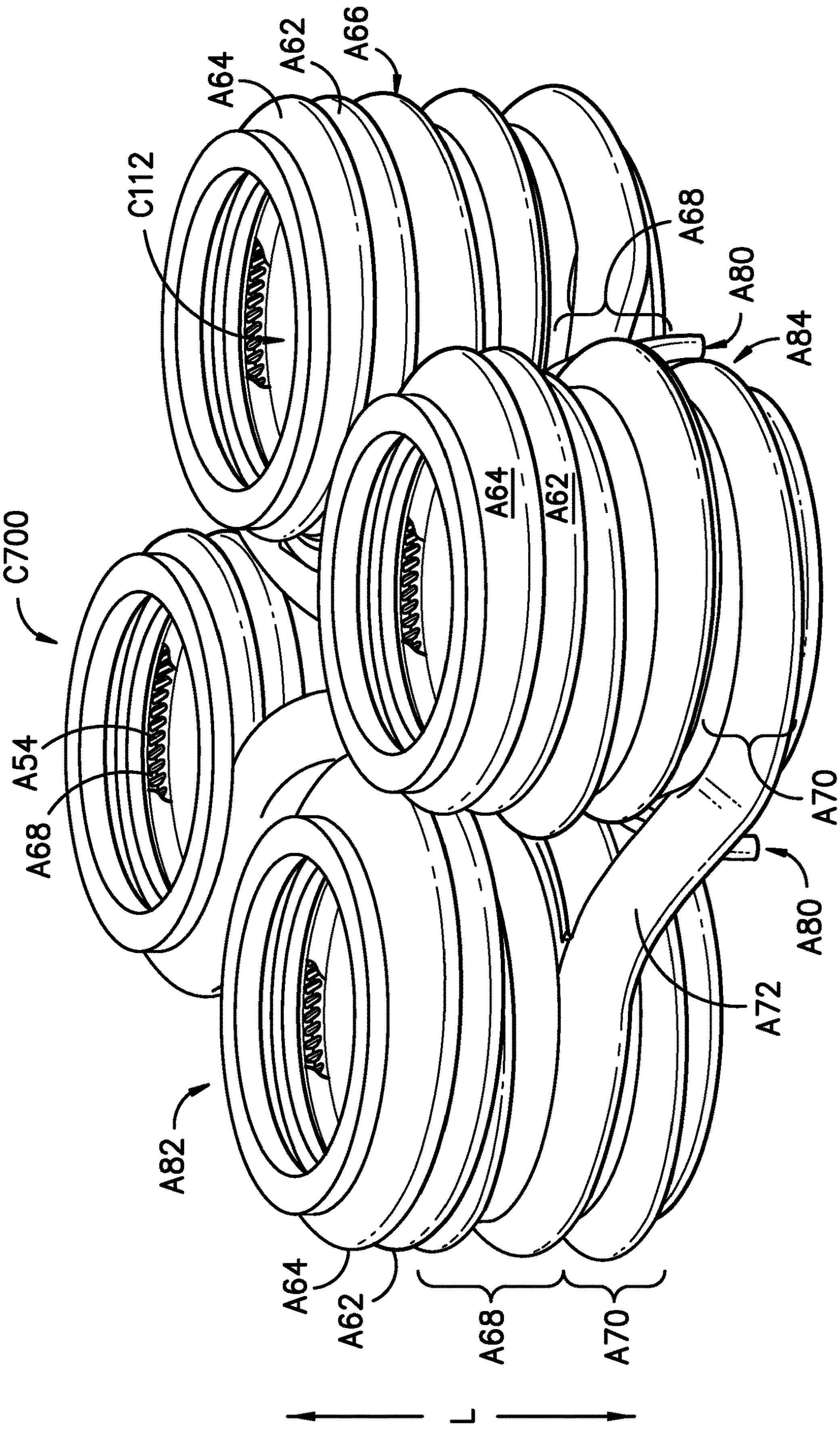
FIG. 1.4.4

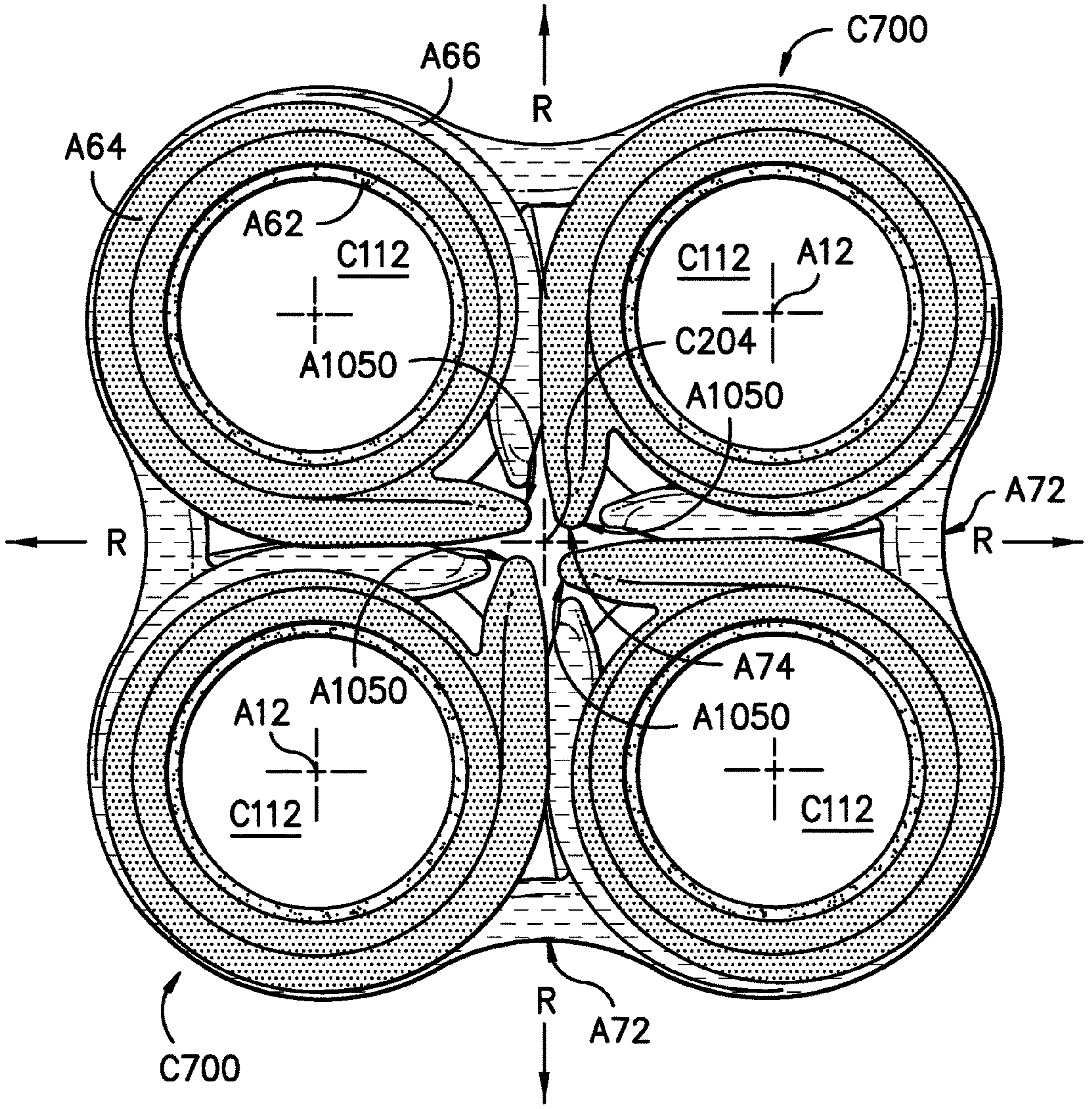
FIG. 1.4.5

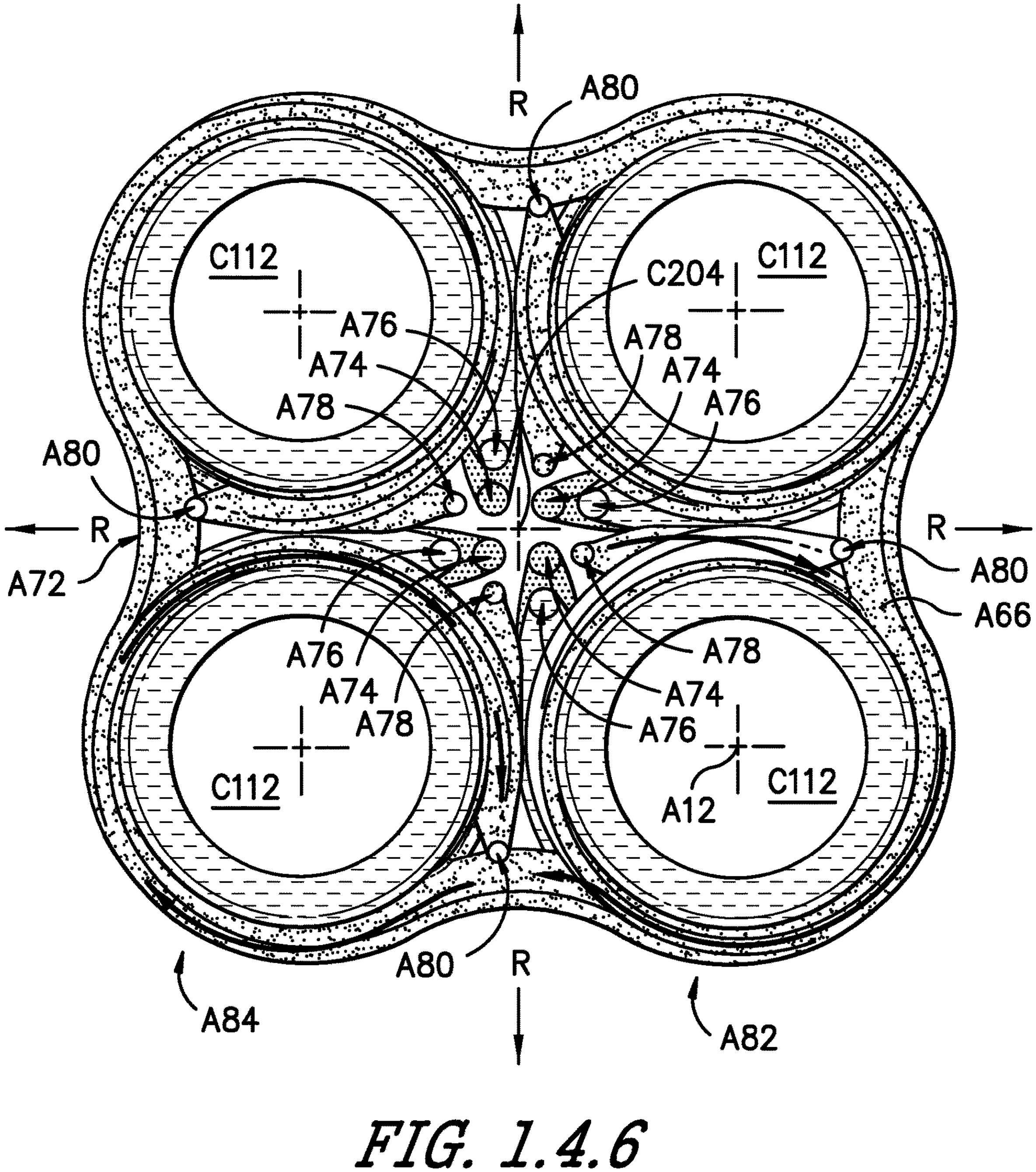
FIG. 1.4.6

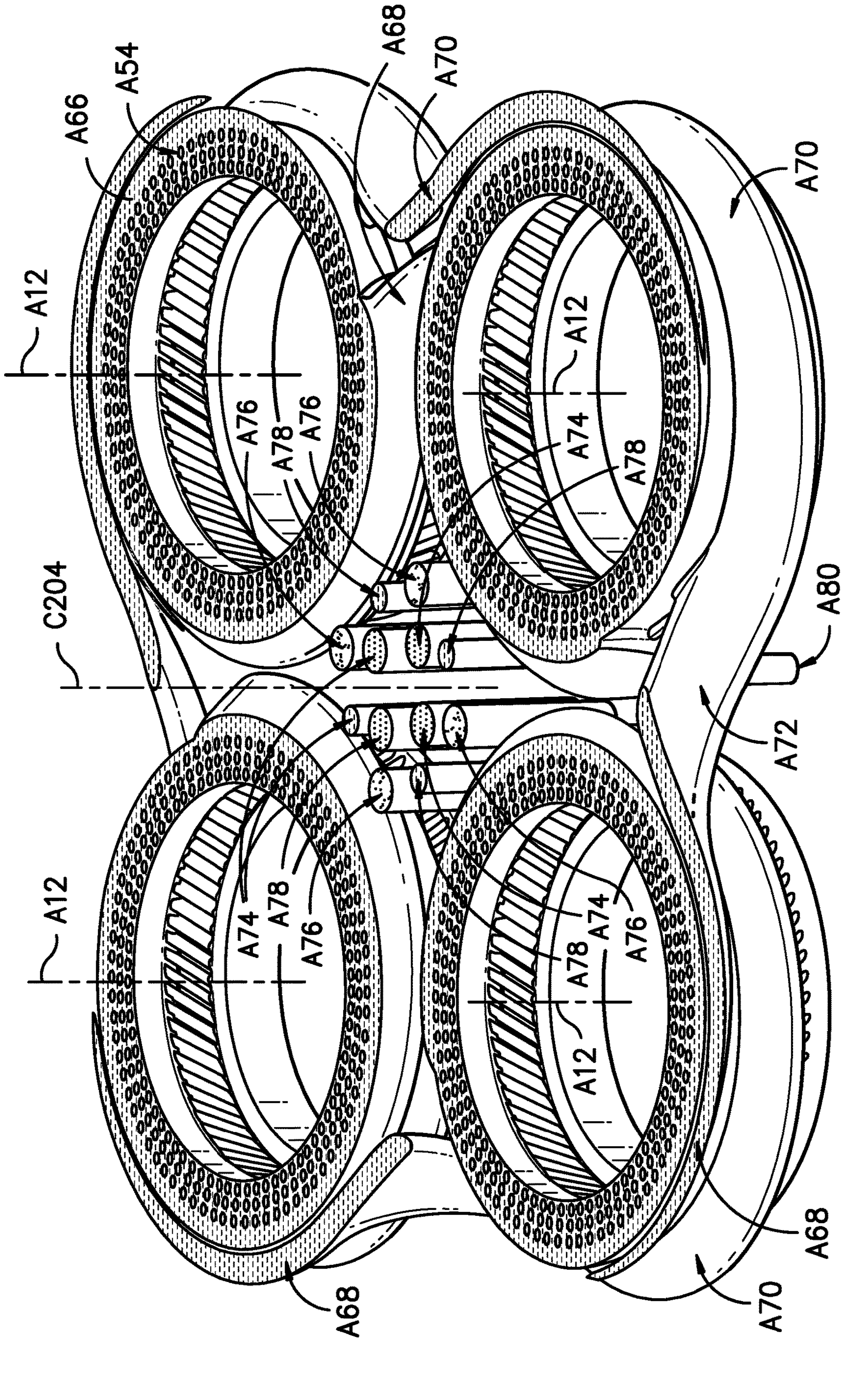
*FIG. 1.4.7*

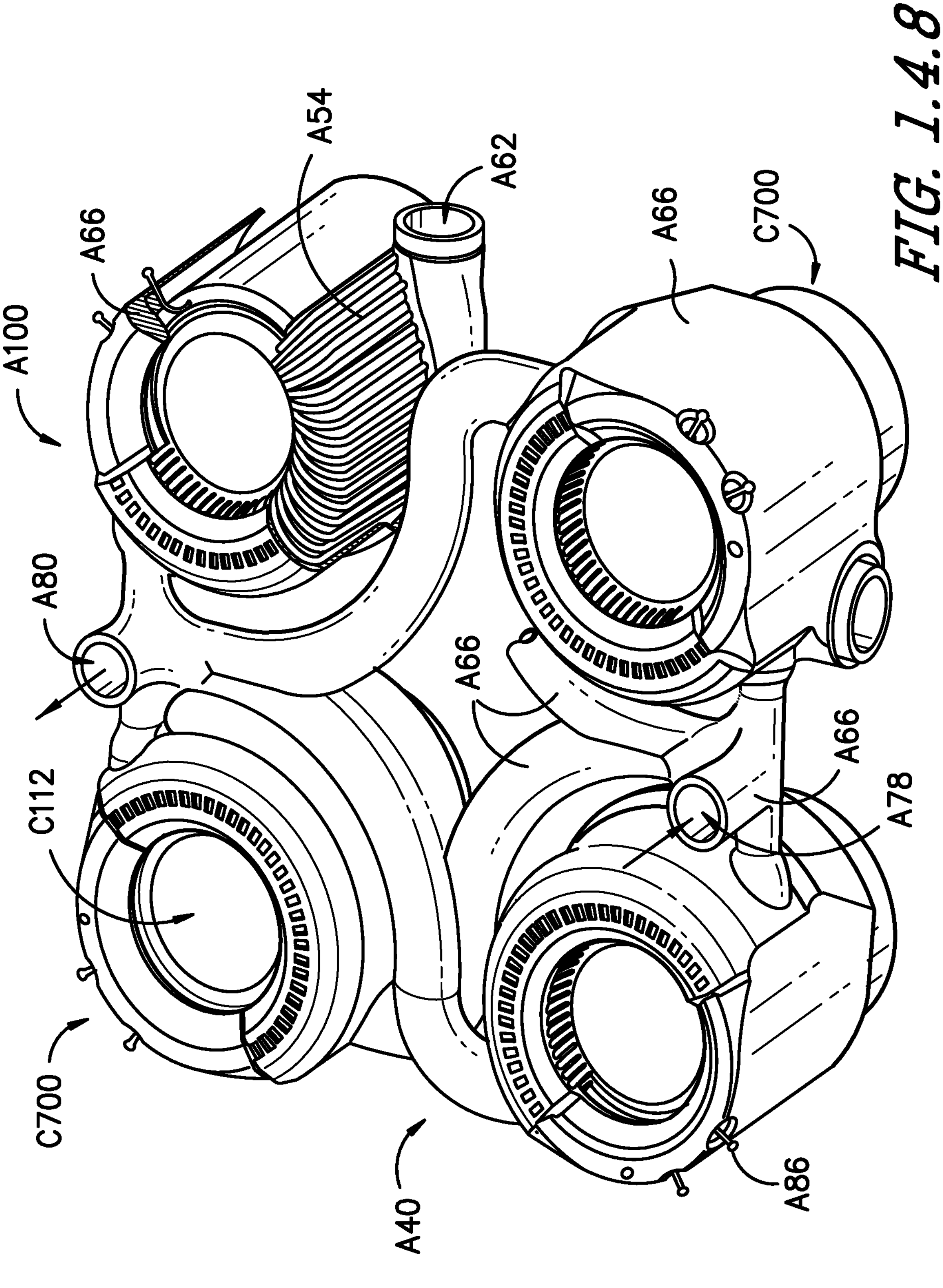
FIG. 1.4.8

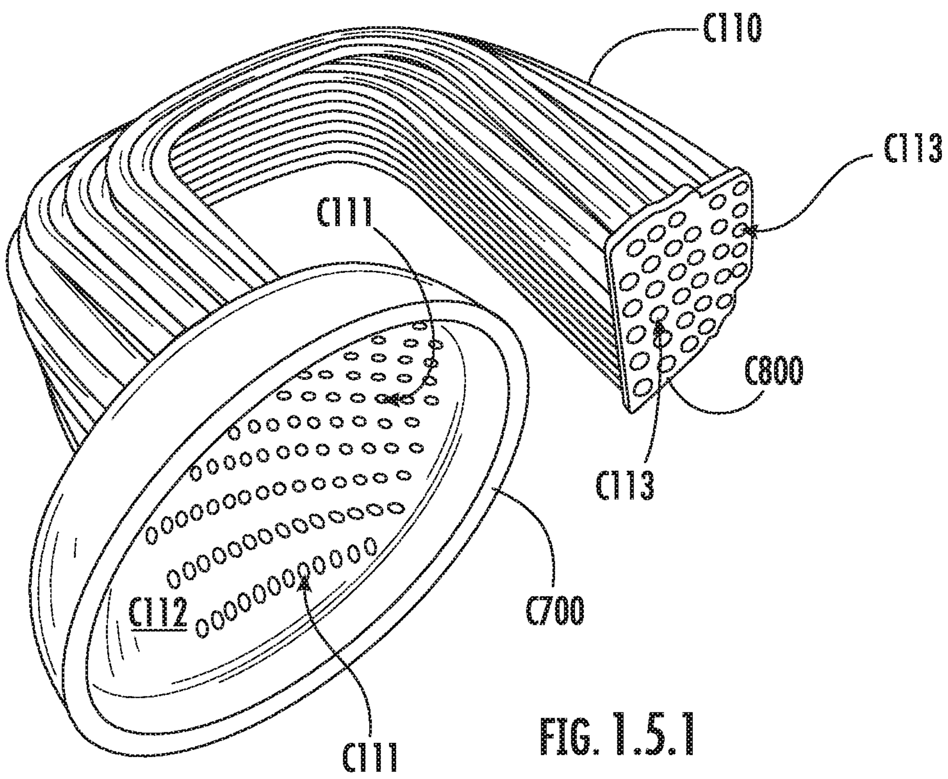
FIG. 1.5.1

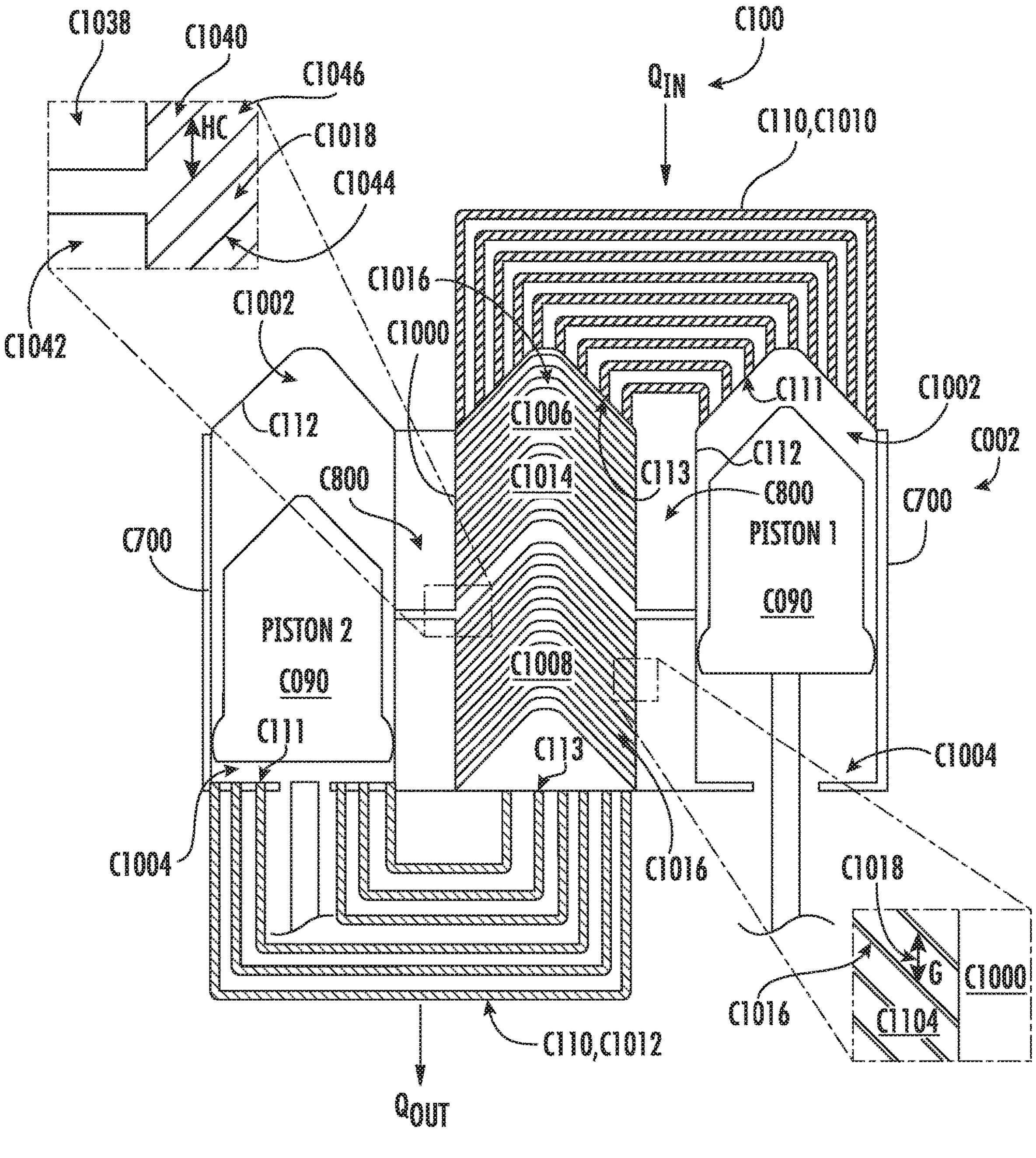
FIG. 1.6.1A

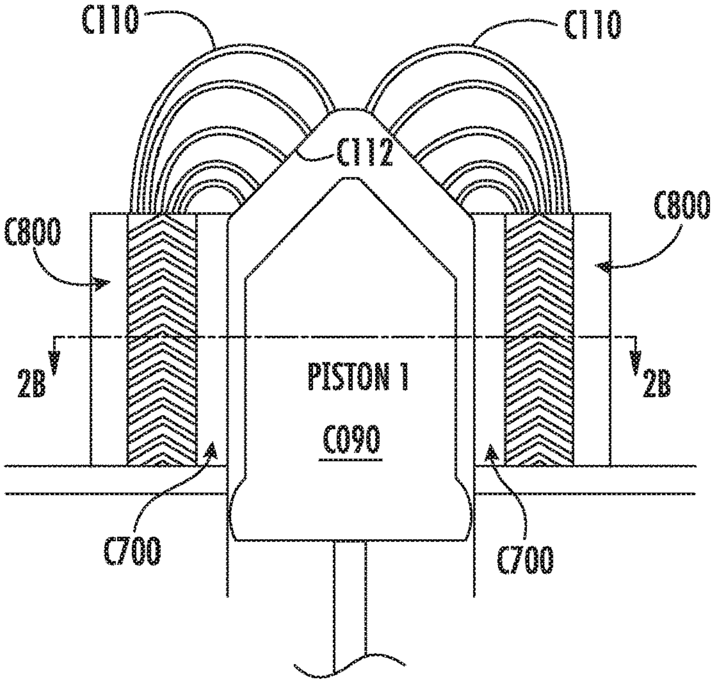
FIG. 1.6.1B
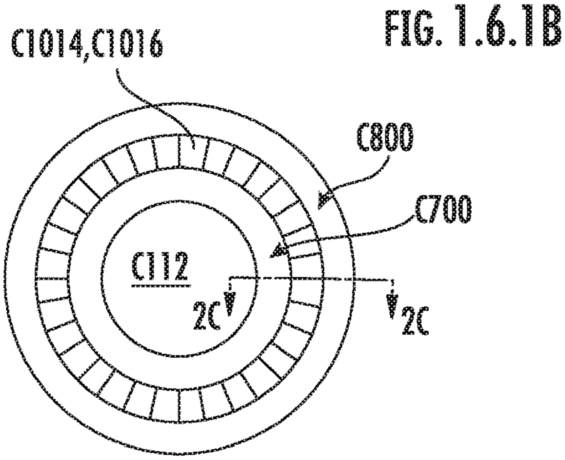
FIG. 1.6.1C
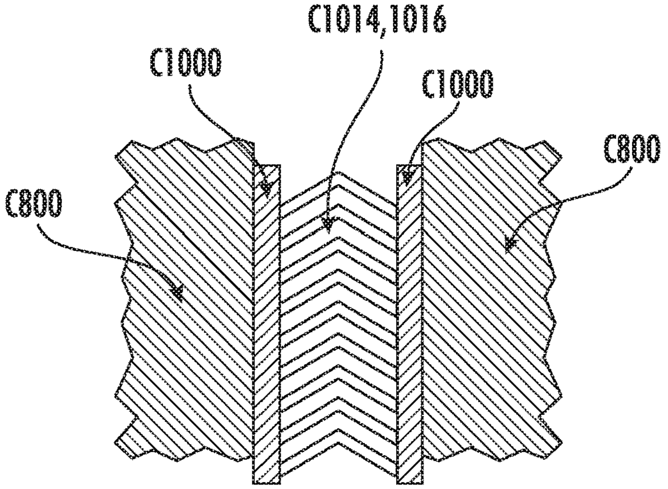
FIG. 1.6.1D

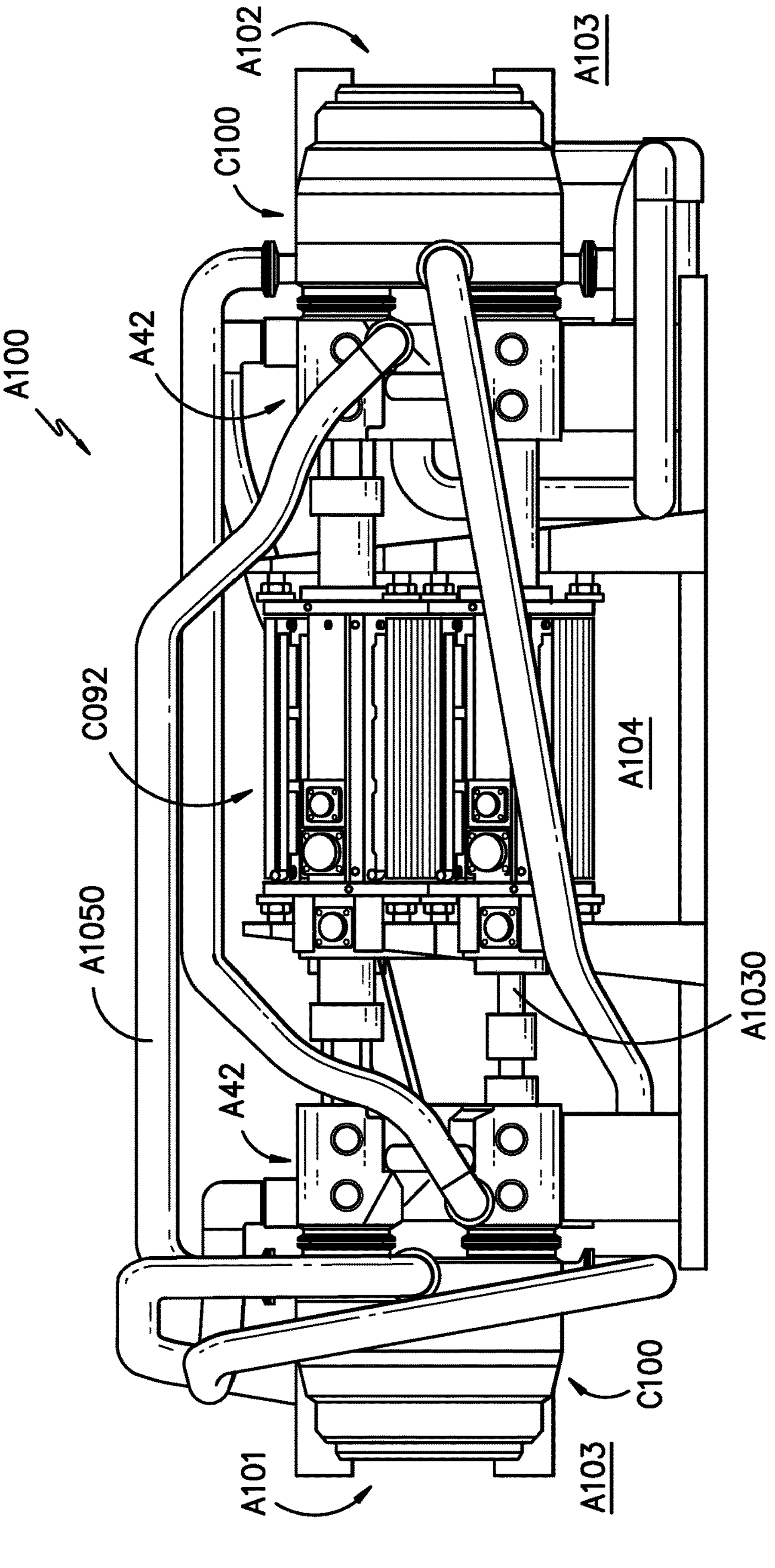
*FIG. 1.7.1*

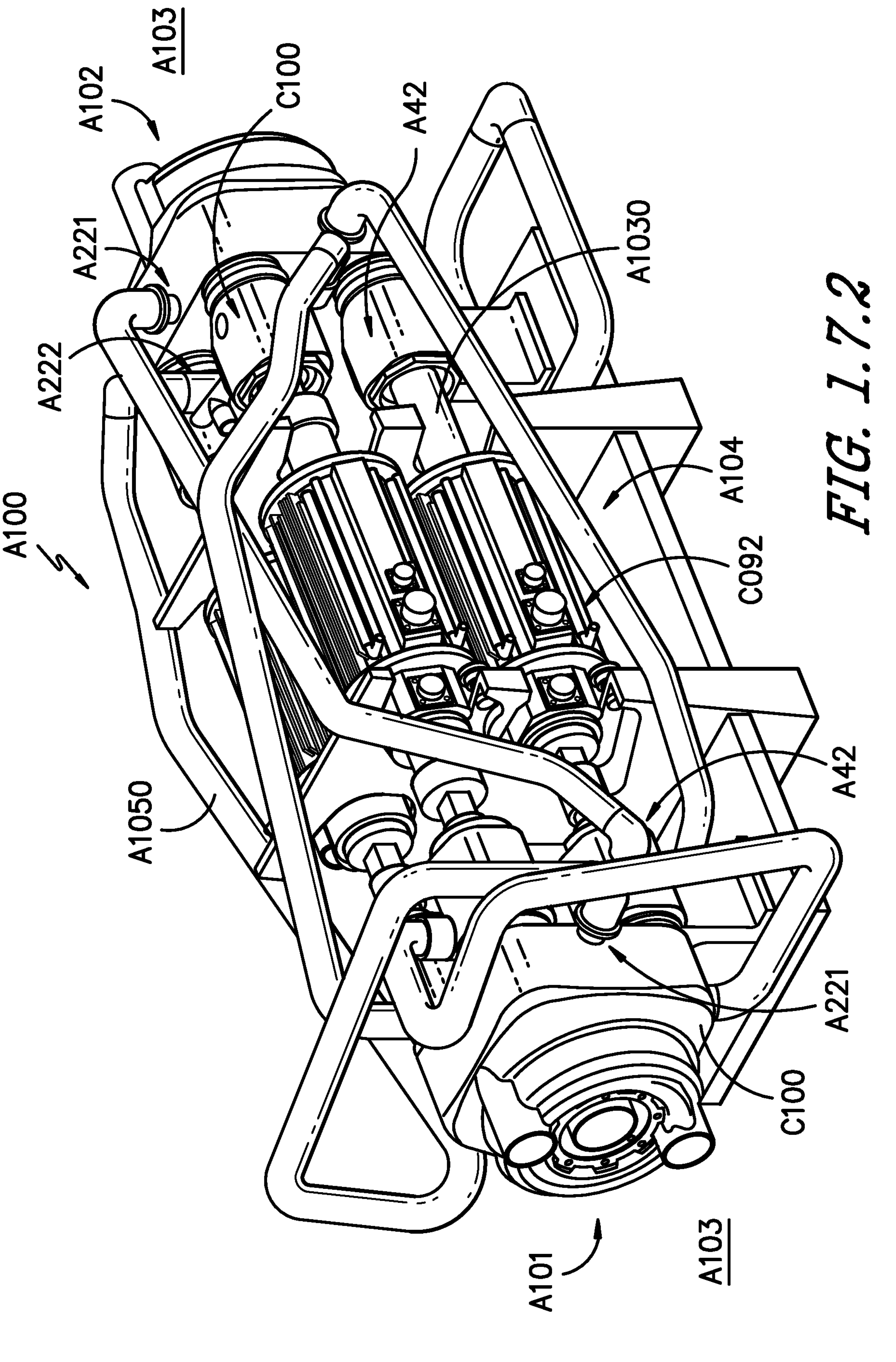
FIG. 1.7.2

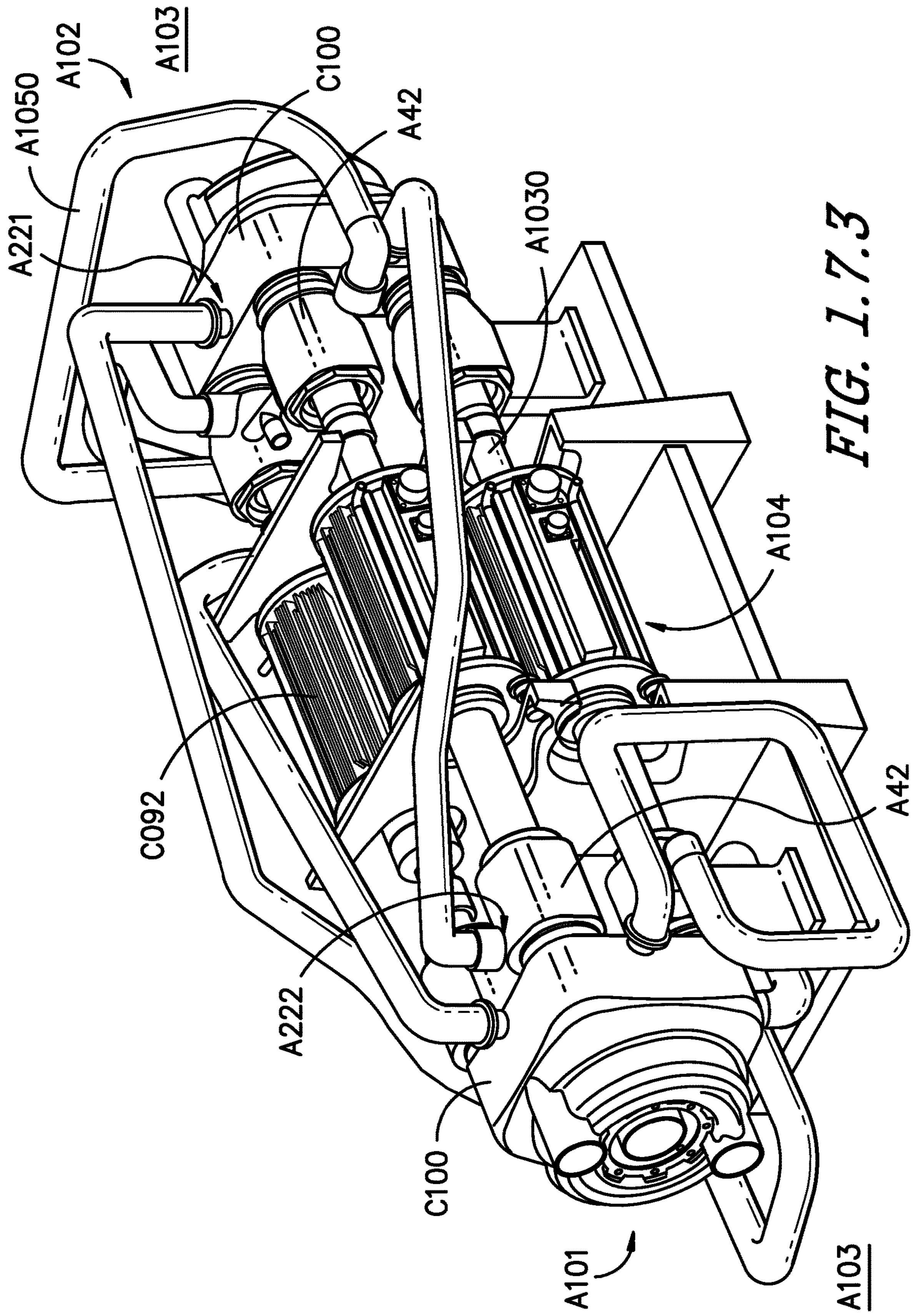
FIG. 1.7.3

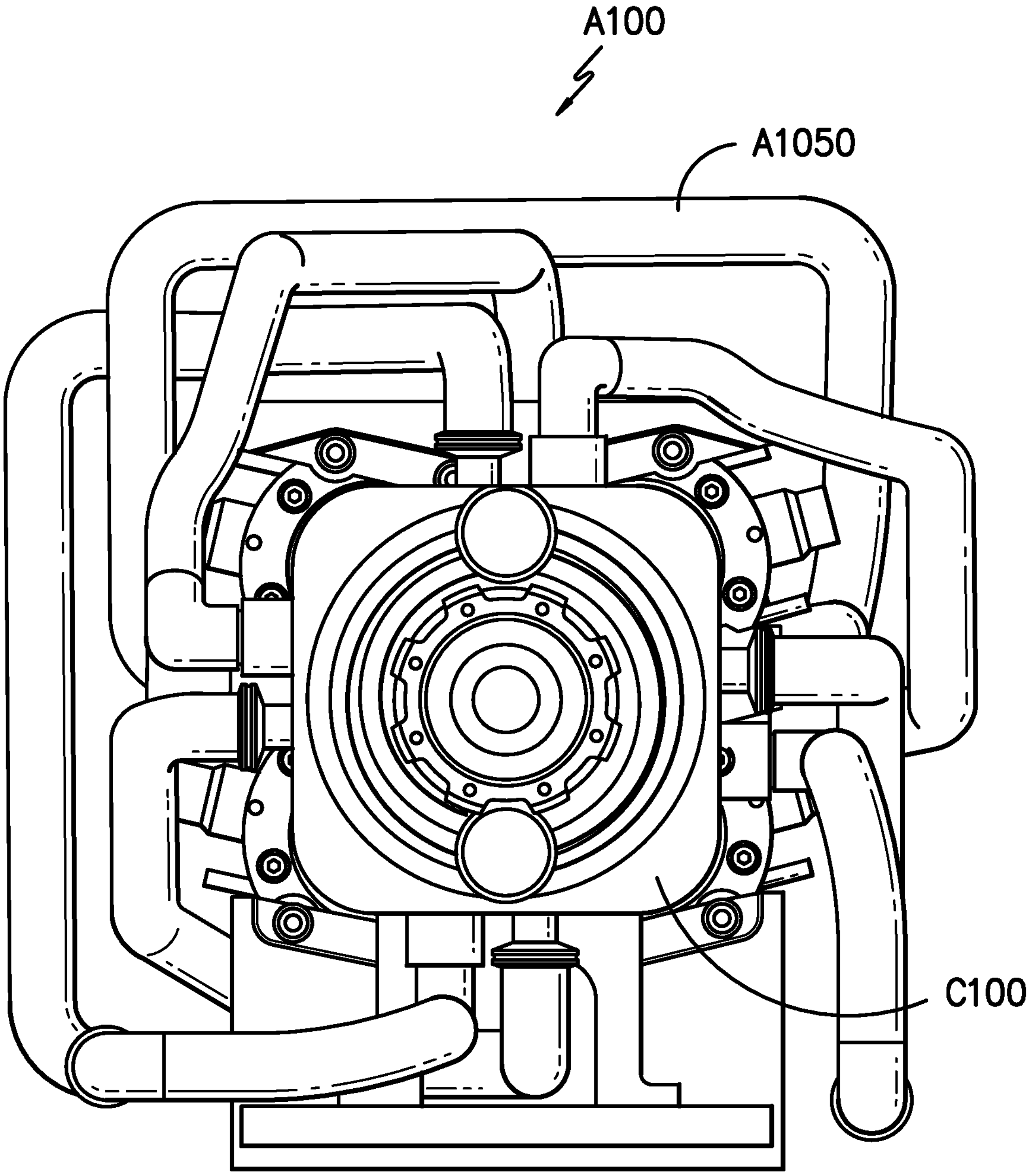
*FIG. 1.7.4*

SYSTEM AND APPARATUS FOR ENERGY CONVERSION

CROSS-REFERENCE TO RELATED APPLICATIONS

The present application claims the benefit of the earliest available effective filing date and is a continuation application of U.S. patent application Ser. No. 16/418,129 titled "SYSTEM AND APPARATUS FOR ENERGY CONVERSION" having a filing date of May 21, 2019 and which is incorporated herein by reference in its entirety.

FIELD

The present subject matter relates generally to energy conversion systems, power generation systems, and energy distribution systems. The present subject matter additionally relates to heat exchangers and heat exchanger systems. The present subject matter further relates to piston engine assemblies, such as closed-cycle engine systems. The present subject matter still further relates to systems and methods for control or operation of one or more systems of the present subject matter herein.

BACKGROUND

Power generation and distribution systems are challenged to provide improved power generation efficiency and/or lowered emissions. Furthermore, power generation and distribution systems are challenged to provide improved power output with lower transmission losses. Certain power generation and distribution systems are further challenged to improve sizing, portability, or power density generally while improving power generation efficiency, power output, and emissions.

Certain engine system arrangements, such as closed cycle engines, may offer some improved efficiency over other engine system arrangements. However, closed cycle engine arrangements, such as Stirling engines, are challenged to provide relatively larger power output or power density, or improved efficiency, relative to other engine arrangements. Closed cycle engines may suffer due to inefficient combustion, inefficient heat exchangers, inefficient mass transfer, heat losses to the environment, non-ideal behavior of the working fluid(s), imperfect seals, friction, pumping losses, and/or other inefficiencies and imperfections. As such, there is a need for improved closed cycle engines and system arrangements that may provide improved power output, improved power density, or further improved efficiency. Additionally, there is a need for an improved closed cycle engine that may be provided to improve power generation and power distribution systems.

Additionally, or alternatively, there is a general need for improved heat transfer devices, such as for heat engines, or as may be applied to power generation systems, distribution systems, propulsion systems, vehicle systems, or industrial or residential facilities.

BRIEF DESCRIPTION

Aspects and advantages of the invention will be set forth in part in the following description, or may be obvious from the description, or may be learned through practice of the invention.

An aspect of the present disclosure is directed to a system for energy conversion. The system includes a closed cycle engine containing a volume of working fluid. The engine includes an expansion chamber and a compression chamber each separated by a piston attached to a connection member of a piston assembly. The engine further includes a plurality of heater conduits extended from the expansion chamber. The engine includes a plurality of chiller conduits extended from the compression chamber. The expansion chamber and heater conduits are fluidly connected to the compression chamber and chiller conduits via a walled conduit.

In various embodiments, the system includes a cold side heat exchanger through which the plurality of chiller conduits is positioned. The cold side heat exchanger comprises a chiller working fluid passage in direct thermal communication with the plurality of chiller conduits. The chiller working fluid passage is fluidly separated from a chiller passage within the plurality of chiller conduits. In one embodiment, the plurality of chiller conduits is extended at least partially co-directional to an extension of the expansion chamber and the compression chamber within the piston body. In another embodiment, the plurality of chiller conduits is extended at least partially circumferentially relative to the piston body. In yet another embodiment, the system further includes a chamber wall extended between an inner volume wall and an outer volume wall. The inner volume wall at least partially defines the compression chamber. The chamber wall, the inner volume wall, and the outer volume wall together define the chiller working fluid passage, and the plurality of chiller conduits is positioned within the chiller working fluid passage fluidly separated from a chiller working fluid within the chiller working fluid passage.

In still various embodiments, the system further includes two or more piston bodies in which the expansion chamber and the compression chamber are positioned within each piston body. The chiller working fluid passage at least partially circumferentially surrounds the piston body in thermal communication with the plurality of chiller conduits. In various embodiments, the chiller working fluid passage includes a first chiller working fluid passage and a second chiller working fluid passage. The first chiller working fluid passage is positioned laterally proximate to the expansion chamber and the second chiller working fluid passage is positioned laterally distal to the expansion chamber relative to the first chiller working fluid passage. In one embodiment, the chiller working fluid flowpath is extended from the first chiller working fluid passage at one piston body to the second chiller working fluid passage at another piston body.

In one embodiment, the engine includes a ratio of maximum cycle volume of the working fluid to a volume of the plurality of chiller conduits between 10 and 100.

In various embodiments, the engine includes a ratio of surface area of the plurality of chiller conduits to volume of the working fluid within the plurality of chiller conduits between 7 and 40. In one embodiment, the surface area of the plurality of chiller conduits is between a chiller passage opening in fluid communication with the compression chamber and a chiller collection chamber opening in fluid communication with a chiller collector.

In one embodiment, the engine includes a ratio of maximum cycle volume of the working fluid to a volume of the plurality of heater conduits between 2.5 and 25.

In still various embodiments, the engine includes a ratio of surface area of the plurality of heater conduits to volume of the working fluid within the plurality of heater conduits between 8 and 40. In one embodiment, the surface area of the plurality of heater conduits is between a first opening in direct fluid communication with the expansion chamber and a second opening in direct fluid communication with the walled conduit.

In various embodiments, the engine includes a first operating parameter defining a maximum ratio of power output from the connection member, in which the first operating parameter includes a multiplication product of pressure of the working fluid, a swept volume of the working fluid, and a cycle frequency of the piston assembly, the maximum ratio being greater than or equal to 0.15. In one embodiment, the maximum ratio of power output from the connection member to the product of pressure of the working fluid, the swept volume of the working fluid, and the cycle frequency of the piston assembly is less than or equal to 0.35.

In one embodiment, the engine includes a second operating parameter defining a ratio of mechanical power output from the piston assembly to maximum cycle volume of the working fluid between 0.0005 and 0.0040 at an engine efficiency of at least 50%.

In various embodiments, the system includes a heater body configured to provide thermal energy to the engine working fluid at the plurality of heater conduits. The engine defines an outer end and an inner end each relative to a lateral extension of the piston assembly, and the outer end defines laterally distal ends of the engine and the inner end defines a laterally inward position of the engine, and the heater body is positioned at the outer end. In one embodiment, the system further includes a load device operably coupled to the piston assembly, in which the load device is positioned at the inner end of the system between the pistons of the piston assembly.

In one embodiment, the engine includes four or more piston assemblies.

In another embodiment, the system includes a third operating parameter defining a multiplication product of power density and efficiency between 51 and 400 kW/cubic meters. In one embodiment, the third operating parameter defines a multiplication product of power density and system efficiency between 51 and 400. In yet another embodiment, the third operating parameter defines a multiplication product of power density and Carnot efficiency of the system between 51 and 400.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure including the best mode, directed to one of ordinary skill in the art, is set forth in the specification, which makes reference to the appended figures, in which:

FIG. 1.2.1 is a schematic block diagram depicting a system for energy conversion according to an aspect of the present disclosure;

FIG. 1.3.1 is a cross sectional view of an exemplary embodiment of a closed cycle engine and load device according to an aspect of the present disclosure;

FIG. 1.3.2 is a perspective cutaway view of an exemplary portion of an exemplary embodiment of an engine according to an aspect of the present disclosure;

FIG. 1.4.1 is a perspective cutaway view of an exemplary portion of an engine according to an aspect of the present disclosure;

FIG. 1.4.2 is a perspective cutaway view of another exemplary portion of a an engine according to an aspect of the present disclosure;

FIG. 1.4.3 is a cutaway view of a portion of an exemplary embodiment of an engine according to an aspect of the present disclosure;

FIG. 1.4.4 is a perspective view of a portion of an exemplary embodiment of an engine according to an aspect of the present disclosure;

FIG. 1.4.5 is a top-down view of fluid flowpaths within a portion of an exemplary embodiment of an engine such as provided in regard to FIG. 1.4.4;

FIG. 1.4.6 is a bottom-up view of fluid flowpaths within a portion of an exemplary embodiment of an engine such as provided in regard to FIG. 1.4.4;

FIG. 1.4.7 is a perspective cutaway view of a portion of an exemplary embodiment of an engine such as provided in regard to FIG. 1.4.4;

FIG. 1.4.8 is a perspective view with a partial cutaway view of a portion of an exemplary embodiment of an engine according to an aspect of the present disclosure;

FIG. 1.5.1 is a perspective view of a portion of an exemplary embodiment of an engine such as provided according to an aspect of the present disclosure;

FIG. 1.6.1A schematically depicts an exemplary regenerator system of an engine according to an aspect of the present disclosure;

FIG. 1.6.1B schematically depicts a cross-sectional view of an exemplary regenerator body in relation to a portion of an engine according to an aspect of the present disclosure;

FIG. 1.6.1C schematically depicts a top cross-sectional view of the exemplary regenerator body of FIG. 1.6.1B;

FIG. 1.6.1D schematically depicts an enlarged perspective cross-sectional view of the exemplary regenerator body of FIG. 1.6.1B;

FIG. 1.7.1 is a side view of an exemplary embodiment of a portion of an engine according to an aspect of the present disclosure;

FIG. 1.7.2 is a perspective view of an exemplary embodiment of a portion of an engine such as provided in regard to FIG. 1.7.1;

FIG. 1.7.3 is another perspective view of an exemplary embodiment of a portion of an engine such as provided in regard to FIGS. 1.7.1 through FIG. 1.7.2; and FIG. 1.7.4 is an end view of an exemplary embodiment of a portion of an engine such as provided in regard to FIGS. 1.7.1 through FIG. 1.7.2.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure and not limitation. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. In another instance, ranges, ratios, or limits associated herein may be altered to provide further embodiments, and all such embodiments are within the scope of the present disclosure. Unless otherwise specified, in various embodiments in which a unit is provided relative to a ratio, range, or limit, units may be altered, and/or subsequently, ranges, ratios, or limits associated thereto are within the scope of the present disclosure. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The term "loop" can be any suitable fluid pathway along which fluid can flow and can be either open or closed, unless stated otherwise.

Power generation and distribution systems are generally challenged to reduce production inefficiencies, transmission losses, and emissions (e.g., oxides of nitrogen, sulfur, or carbon) during and post energy production. For example, the U.S. Energy Information Administration (EIA) estimates that electricity transmission and distribution (T&D) losses average about 5% annually in the United States, with other estimates of line losses of 8% or higher. With average power plant efficiencies in the United States of about 30% to 40%, overall electrical efficiency at the end user (e.g., residences, businesses, etc.) is approximately 25% to 35%. Local, distributed, or on-demand power generation may not require access to T&D networks or grids, such as to result in an at least 5% improvement in efficiency, in addition to reducing emission and adverse environmental impacts.

Heat engines and other devices for converting thermal energy into useful work are generally inefficient relative to their maximum theoretical efficiency. Carnot's theorem states that the maximum theoretical efficiency ($\eta_{Carnot}$) for an ideal, reversible heat engine is given by:

$$\eta_{Carnot} = 1 - \left(\frac{T_{Hot,engine}}{T_{Cold,ambient}}\right)$$

where $T_{hot,engine}$ is the absolute temperature (e.g. in Rankine or Kelvin) at which heat enters the engine and $T_{cold,ambient}$ is the absolute temperature of the environment into which the engine exhausts its waste heat. $T_{Hot,engine}$ is generally limited by the maximum operating temperature of the materials in the engine and $T_{Cold,ambient}$ is limited by an available heat sink available (e.g., the atmosphere at ambient temperature, the temperature of a body of water, etc.). Closed cycle heat engines operate through an exchange of thermal energy to and from relatively hot and cold volumes of a piston engine. Closed cycle heat engines, such as Stirling arrangements, or variations thereof, such as Franchot or Vuilleimier arrangements, generally have a maximum theoretical efficiency that is the Carnot efficiency. As such, closed cycle engines such as Stirling arrangements are considered to have a greater potential as high efficiency engines based at least on the difference in maximum theoretical efficiency and actual efficiency.

Achieving maximum theoretical efficiency of a system is challenged or limited based at least on inefficient combustion, inefficient heat exchange, heat losses to a surrounding environment, non-ideal behavior of one or more working fluids, friction losses, pumping losses, or other inefficiencies and imperfections, or energy required to operate the system. Actual or real thermal efficiency $\eta_{th,system}$ of a system including a heat engine, heat generation sources, heat removal systems, or other heat exchangers, is given by:

$$\eta_{th,system} \equiv \frac{W_{out}}{Q_{in} + E_{in} + W_{in}} = \frac{\left(Q_{in} + E_{in} + W_{in}E_{in} + Q_{in} - \sum Q_{out}\right)}{Q_{in} + E_{in} + W_{in}Q_{in}}$$

Actual or real thermal efficiency $\eta_{th}$ of a heat engine is given by:

$$\eta_{th} = \frac{W_{out}}{Q_{in}} = \frac{Q_{in} - Q_{out}}{Q_{in}} = 1 - \frac{Q_{out}}{Q_{in}}$$

where $W_{out}$ is the net useful work done by the engine, $Q_{in}$ is the thermal energy received by the engine, and $Q_{out}$ is the thermal energy lost or rejected to the environment. $E_{in}$ is the electrical energy used by the system for operation of the system (e.g., fuel and/or oxidizer pumps, cooling sources, etc.). $W_{in}$ is work input into the system. Achievable thermal efficiency tends to increase with power output. For example, motor vehicle applications are generally 20% to 35% thermally efficient, while large marine and stationary diesel systems can exceed 50% thermal efficiency (FIG. 1.1.3). Stirling engines have demonstrated thermal efficiencies up to 38%.

The useful work generated by a heat engine can further be converted into electrical energy. The electrical efficiency ($\eta_{El}$) can be calculated in the same manner as the thermal efficiency:

$$\eta_{El} = \frac{E_{out}}{Q_{in}}$$

where $E_{out}$ is the net electrical energy output from an electric machine that is operatively coupled to the engine and $Q_{in}$ is the thermal energy received by the engine. $E_{out}$ may be calculated by subtracting any electricity required to operate the power generation system from the gross power generated by the system. If combustion is the source of heating working fluid for the engine, the electrical efficiency may be calculated using a lower heating value (LHV) of the fuel. Stirling engines have demonstrated LHV electrical efficiencies between 10% and 30%.

Closed cycle engines, such as Stirling arrangements, are challenged to produce increasing levels of power output and power density, and generally compromise improved efficiency or power output with larger sizes and scaling. Such larger sizes or scales can negate other desirable qualities of the engine, such as relatively small-scale or portability.

Stirling engines may generally include two types: kinematic or free piston. Kinematic Stirling engines use mechanically-connected piston assemblies to transmit and convert linear motion of the pistons to a rotary motion for an output shaft. Although such systems may address issues regarding power transmission and stability of the engine, mechanically-connected piston assemblies introduce relatively large power losses via the mechanical members. Additionally, or alternatively, the relatively fixed relationship of mechanically-connected piston assemblies limits the mechanical stroke of the piston assembly. As such, the efficiency of mechanically-connected multi-piston assemblies in a closed cycle engine is decreased in addition to mechanical losses (e.g., friction, leakage, inertia, etc.).

Single-piston free piston closed cycle engine arrangements generally exchange improved thermal efficiency for lower total power generation and density. As such, single-piston free piston closed cycle engine arrangements are not generally suited for higher power output applications.

Multi-piston free piston closed cycle engine arrangements may provide thermal efficiencies of single-piston free piston arrangements and further increase total power generation. However, multi-piston free piston arrangements generally differ from single-piston arrangements and mechanically-connected multi-piston arrangements in that the cycle or motion of a multi-piston free piston arrangement is generally determined by thermo-mechanical interactions of the entire system including the free pistons, the thermal source(s), and a power extraction apparatus. The thermo-mechanical interactions may further include mechanical losses and their effect on balance of the entire system.

For example, multi-piston free-piston closed cycle engines are challenged to respond to time lags. As another example, if one piston assembly drifts from an intended position a subsequent oscillation can become unbalanced. An unbalanced arrangement may lead to undesired vibrations, crashing of the pistons to end walls, or other mechanical losses that may further reduce power output, induce wear and deterioration, or otherwise reduce efficient, stable, or effective use of a multi-piston free piston engine.

As such, there is a need for improved closed cycle engines such as Stirling engines that provide improved power generation efficiency and output. Additionally, there is a need for such improved closed cycle engines that may further retain or improve power density, such as to provide relatively small-scale or portability such as to provide improved application to power generation and distribution systems.

Referring now to FIG. 1.2.1, an exemplary schematic block diagram depicting a system for energy conversion (hereinafter, "system A10") is provided. Various embodiments of the system A10 provided herein include systems for power generation, a heat recovery system, a heat pump or cryogenic cooler, a system including and/or acting as a bottoming cycle and/or a topping cycle, or other system for producing useful work or energy, or combinations thereof. Referring additionally for FIG. 1.3.1, various embodiments of the system A10 include a closed cycle engine apparatus (hereinafter, "engine A100", apparatus "A100", or otherwise denoted herein) operably coupled to a load device C092. The engine A100 contains a substantially fixed mass of an engine working fluid to which and from which thermal energy is exchanged at a respective cold side heat exchanger A42 and a hot side heat exchanger C108. In one embodiment, the engine working fluid is helium. In other embodiments, the engine working fluid may include air, nitrogen, hydrogen, helium, or any appropriate compressible fluid, or combinations thereof. In still various embodiments, any suitable engine working fluid may be utilized in accordance with the present disclosure. In exemplary embodiments, the engine working fluid may include a gas, such as an inert gas. For example, a noble gas, such as helium may be utilized as the engine working fluid. Exemplary working fluids preferably are inert, such that they generally do not participate in chemical reactions such as oxidation within the environment of the engine. Exemplary noble gasses include monoatomic gases such as helium, neon, argon, krypton, or xenon, as well as combinations of these. In some embodiments, the engine working fluid may include air, oxygen, nitrogen, or carbon dioxide, as well as combinations of these. In still various embodiments, the engine working fluid may be liquid fluids of one or more elements described herein, or combinations thereof. It should further be appreciated that various embodiments of the engine working fluid may include particles or other substances as appropriate for the engine working fluid.

In various embodiments, the load device C092 is a mechanical work device or an electric machine. In one embodiment, the load device C092 is a pump, compressor, or other work device. In another embodiment, the load device C092 as an electric machine is configured as a generator producing electric energy from movement of a piston assembly A1010 at the engine. In still another embodiment, the electric machine is configured as a motor providing motive force to move or actuate the piston assembly A1010, such as to provide initial movement (e.g., a starter motor). In still various embodiments, the electric machine defines a motor and generator or other electric machine apparatus such as described further herein.

A heater body C100 is thermally coupled to the engine A100. The heater body C100 may generally define any apparatus for producing or otherwise providing a heating working fluid such as to provide thermal energy to the engine working fluid. Various embodiments of the heater body C100 are further provided herein. Exemplary heater bodies C100 may include, but are not limited to, a combustion or detonation assembly, an electric heater, a nuclear energy source, a renewable energy source such as solar power, a fuel cell, a heat recovery system, or as a bottoming cycle to another system. Exemplary heater bodies C100 at which a heat recovery system may be defined include, but are not limited to, industrial waste heat generally, gas or steam turbine waste heat, nuclear waste heat, geothermal energy, decomposition of agricultural or animal waste, molten earth or metal or steel mill gases, industrial drying systems generally or kilns, or fuel cells. The exemplary heater body C100 providing thermal energy to the engine working fluid may include all or part of a combined heat and power cycle, or cogeneration system, or power generation system generally.

In still various embodiments, the heater body C100 is configured to provide thermal energy to the engine working fluid via a heating working fluid. The heating working fluid may be based, at least in part, on heat and liquid, gaseous, or other fluid provided by one or more fuel sources and oxidizer sources providing a fuel and oxidizer. In various embodiments, the fuel includes, but is not limited to, hydrocarbons and hydrocarbon mixtures generally, "wet" gases including a portion of liquid (e.g., humid gas saturated with liquid vapor, multiphase flow with approximately 10% liquid and approximately 90% gas, natural gas mixed with oil, or other liquid and gas combinations, etc.), petroleum or oil (e.g., Arabian Extra Light Crude Oil, Arabian Super Light, Light Crude Oil, Medium Crude Oil, Heavy Crude Oil, Heavy Fuel Oil, etc.), natural gas (e.g., including sour gas), biodiesel condensate or natural gas liquids (e.g., including liquid natural gas (LNG)), dimethyl ether (DME), distillate oil #2 (DO2), ethane ($C_2$), methane, high $H_2$ fuels, fuels including hydrogen blends (e.g., propane, butane, liquefied petroleum gas, naphtha, etc.), diesel, kerosene (e.g., jet fuel, such as, but not limited to, Jet A, Jet A-1, JP1, etc.), alcohols (e.g., methanol, ethanol, etc.), synthesis gas, coke over gas, landfill gases, etc., or combinations thereof.

In various embodiments, the system A10 includes a working fluid body C108, such as further described herein. In one embodiment, the working fluid body C108 defines a hot side heat exchanger A160, such as further described herein, from which thermal energy is output to the engine working fluid at an expansion chamber A221 of the engine. The working fluid body C108 is positioned at the expansion chamber A221 of the engine in thermal communication with the heater body C100. In other embodiments, the working fluid body C108 may be separate from the heater body C100, such that the heating working fluid is provided in thermal communication, or additionally, in fluid communication with the working fluid body C108. In particular embodiments, the working fluid body C108 is positioned in direct thermal communication with the heater body C100 and the expansion chamber A221 of the engine A100 such as to receive thermal energy from the heater body C100 and provide thermal energy to the engine working fluid within the engine.

In still various embodiments, the heater body C100 may include a single thermal energy output source to a single expansion chamber A221 of the engine. As such, the system A10 may include a plurality of heater assemblies each providing thermal energy to the engine working fluid at each expansion chamber A221. In other embodiments, such as depicted in regard to FIG. 1.3.1, the heater body C100 may provide thermal energy to a plurality of expansion chambers A221 of the engine. In still other embodiments, such as depicted in regard to FIG. 8, the heater body includes a single thermal energy output source to all expansion chambers A221 of the engine.

The system A10 further includes a chiller assembly, such as chiller assembly A40 further described herein. The chiller assembly A40 is configured to receive and displace thermal energy from a compression chamber A222 of the engine. The system A10 includes a cold side heat exchanger A42 thermally coupled to the compression chamber A222 of the closed cycle engine and the chiller assembly. In one embodiment, the cold side heat exchanger A42 and the piston body C700 defining the compression chamber A222 of the engine are together defined as an integral, unitary structure, such as further shown and described in regard to FIGS. 1.4.1-1.4.7. In still various embodiments, the cold side heat exchanger A42, at least a portion of the piston body C700 defining the compression chamber A222, and at least a portion of the chiller assembly together define an integral, unitary structure.

In various embodiments, the chiller assembly A40 is a bottoming cycle to the engine A100. As such, the chiller assembly A40 is configured to receive thermal energy from the engine A100. The thermal energy received at the chiller assembly A40, such as through a cold side heat exchanger A42, or cold side heat exchanger A170 further herein, from the engine A100 is added to a chiller working fluid at the chiller assembly A40. In various embodiments, the chiller assembly A40 defines a Rankine cycle system through which the chiller working fluid flows in closed loop arrangement with a compressor. In some embodiments, the chiller working fluid is further in closed loop arrangement with an expander. In still various embodiments, the system A10 includes a heat exchanger A88 (FIG. 1.3.2). In various embodiments, the heat exchanger A188 may include a condenser or radiator. The cold side heat exchanger A40 is positioned downstream of the compressor and upstream of the expander and in thermal communication with a compression chamber A222 of the closed cycle engine, such as further depicted and described in regard to FIG. 1.3.1-FIG. 1.3.2. In various embodiments, the cold side heat exchanger A42 may generally define an evaporator receiving thermal energy from the engine A40.

Referring still to FIG. 1.2.1, in some embodiments, the heat exchanger A188 is positioned downstream of the expander and upstream of the compressor and in thermal communication with a cooling working fluid. In the schematic block diagram provided in FIG. 1.2.1, the cooling working fluid is an air source. However, in various embodiments, the cooling fluid may define any suitable fluid in thermal communication with the heat exchanger. The heat exchanger may further define a radiator configured to emit or dispense thermal energy from the chiller assembly A40. A flow of cooling working fluid from a cooling fluid source is provided in thermal communication with the heat exchanger to further aid heat transfer from the chiller working fluid within the chiller assembly A40 to the cooling working fluid.

As further described herein, in various embodiments the chiller assembly A40 may include a substantially constant density heat exchanger. The constant density heat exchanger generally includes a chamber including an inlet and an outlet each configured to contain or trap a portion of the chiller working fluid for a period of time as heat from the closed cycle engine is transferred to the cold side heat exchanger A42. In various embodiments, the chamber may define a linear or rotary chamber at which the inlet and the outlet are periodically opened and closed via valves or ports such as to trap the chiller working fluid within the chamber for the desired amount of time. In still various embodiments, the rate at which the inlet and the outlet of the chamber defining the constant density heat exchanger is a function at least of velocity of a particle of fluid trapped within the chamber between the inlet and the outlet. The chiller assembly A40 including the constant density heat exchanger may provide efficiencies, or efficiency increases, performances, power densities, etc. at the system A10 such as further described herein.

It should be appreciated that in other embodiments, the chiller assembly A40 of the system A10 may include a thermal energy sink generally. For example, the chiller assembly A40 may include a body of water, the vacuum of space, ambient air, liquid metal, inert gas, etc. In still various embodiments, the chiller working fluid at the chiller assembly A40 may include, but is not limited to, compressed air, water or water-based solutions, oil or oil-based solutions, or refrigerants, including, but not limited to, class 1, class 2, or class 3 refrigerants. Further exemplary refrigerants may include, but are not limited to, a supercritical fluid including, but not limited to, carbon dioxide, water, methane, ethane, propane, ethylene, propylene, methanol, ethanol, acetone, or nitrous oxide, or combinations thereof. Still exemplary refrigerants may include, but are not limited to, halon, perchloroolefin, perchlorocarbon, perfluoroolefin, perfluororcarbon, hydroolefin, hydrocarbon, hydrochloroolefin, hydrochlorocarbon, hydrofluoroolefin, hydrofluorocarbon, hydrochloroolefin, hydrochlorofluorocarbon, chlorofluoroolefin, or chlorofluorocarbon type refrigerants, or combinations thereof. Still further exemplary embodiments of refrigerant may include, but are not limited to, methylamine, ethylamine, hydrogen, helium, ammonia, water, neon, nitrogen, air, oxygen, argon, sulfur dioxide, carbon dioxide, nitrous oxide, or krypton, or combinations thereof.

It should be appreciated that where combustible or flammable refrigerants are included for the chiller working fluid, various embodiments of the system A10 may beneficially couple the heater body C100, and/or the fuel source, and the chiller assembly A40 in fluid communication such that the combustible or flammable working fluid to which thermal energy is provided at the chiller assembly A40 may further be utilized as the fuel source for generating heating working fluid, and the thermal energy therewith, to output from the heater body C100 to the engine working fluid at the engine A100.

Various embodiments of the system A10 include control systems and methods of controlling various sub-systems disclosed herein, such as, but not limited to, the fuel source, the oxidizer source, the cooling fluid source, the heater body C100, the chiller assembly C40, the engine A100, and the load device C092, including any flow rates, pressures, temperatures, loads, discharges, frequencies, amplitudes, or other suitable control properties associated with the system A10. In one aspect, a control system for the system A10 defining a power generation system is provided. The power generation system includes one or more closed cycle engines (such as engine A100), one or more load devices defining electric machines (such as load device C092) operatively coupled to the engine, and one or more energy storage devices in communication with the electric machines.

The control system can control the closed cycle engine and its associated balance of plant to generate a temperature differential, such as a temperature differential at the engine working fluid relative to the heating working fluid and the chiller working fluid. Thus, the engine defines a hot side, such as at the expansion chamber A221, and a cold side, such as at the compression chamber A222. The temperature differential causes free piston assemblies A1010 to move within their respective piston chambers defined at respective piston bodies C700. The movement of the pistons A1011 causes the electric machines to generate electrical power. The generated electrical power can be provided to the energy storage devices for charging thereof. The control system monitors one or more operating parameters associated with the closed cycle engine, such as piston movement (e.g., amplitude and position), as well as one or more operating parameters associated with the electric machine, such as voltage or electric current. Based on such parameters, the control system generates control commands that are provided to one or more controllable devices of the system A10. The controllable devices execute control actions in accordance with the control commands. Accordingly, the desired output of the system A10 can be achieved.

Furthermore, the control system can monitor and anticipate load changes on the electric machines and can control the engine A100 to anticipate such load changes to better maintain steady state operation despite dynamic and sometimes significant electrical load changes on the electric machines. A method of controlling the power generation system is also provided. In another aspect, a control system for a heat pump system is provided. The heat pump system includes one or more of the closed cycle engines described herein. A method of controlling the heat pump system is also provided. The power generation and heat pump systems as well as control methods therefore are provided in detail herein.

Referring now to FIG. 1.3.1-FIG. 1.3.2, exemplary embodiments of the system A10 are further provided. FIG. 1.3.1 is an exemplary cross sectional view of the system A10 including the heater body C100 and the chiller assembly A40 each in thermal communication with the engine A100, or particularly the engine working fluid within the engine A100, such as shown and described according to the schematic block diagram of FIG. 1.2.1. FIG. 1.3.2 is an exemplary cutaway perspective view of a portion of the engine A100. The system A10 includes a closed cycle engine A100 including a piston assembly A1010 positioned within a volume or piston chamber C112 defined by a wall defining a piston body C700. The volume within the piston body C700 is separated into a first chamber, or hot chamber, or expansion chamber A221 and a second chamber, or cold chamber (relative to the hot chamber), or compression chamber A222 by a piston A1011 of the piston assembly A1010. The expansion chamber A221 is positioned thermally proximal to the heater body C100 relative to the compression chamber A222 thermally distal to the heater body C100. The compression chamber A222 is positioned thermally proximal to the chiller assembly A40 relative to the expansion chamber A221 thermally distal to the chiller assembly A40.

In various embodiments, the piston assembly A1010 defines a double-ended piston assembly A1010 in which a pair of pistons A1011 is each coupled to a connection member A1030. The connection member A1030 may generally define a rigid shaft or rod extended along a direction of motion of the piston assembly A1010. In other embodiments, the connection members A1030 includes one or more springs or spring assemblies, such as further provided herein, providing flexible or non-rigid movement of the connection member A1030. In still other embodiments, the connection member A1030 may further define substantially U- or V-connections between the pair of pistons A1011.

Each piston A1011 is positioned within the piston body C700 such as to define the expansion chamber A221 and the compression chamber A222 within the volume of the piston body C700. The load device c092 is operably coupled to the piston assembly A1010 such as to extract energy therefrom, provide energy thereto, or both. The load device c092 defining an electric machine is in magnetic communication with the closed cycle engine via the connection member A1030. In various embodiments, the piston assembly A1010 includes a dynamic member A181 positioned in operable communication with a stator assembly A182 of the electric machine. The stator assembly A182 may generally include a plurality of windings wrapped circumferentially relative to the piston assembly A1010 and extended along a lateral direction L. In one embodiment, such as depicted in regard to FIG. 1.3.1, the dynamic member A181 is connected to the connection member A1030. The electric machine may further be positioned between the pair of pistons A1011 of each piston assembly A1010. Dynamic motion of the piston assembly A1010 generates electricity at the electric machine. For example, linear motion of the dynamic member A181 between each pair of chambers defined by each piston A1011 of the piston assembly A1010 generates electricity via the magnetic communication with the stator assembly A182 surrounding the dynamic member A181.

Referring to FIG. 1.3.1-FIG. 1.3.2, in various embodiments, the working fluid body C108 may further define at least a portion of the expansion chamber A221. In one embodiment, such as further described herein, the working fluid body C108 defines a unitary or monolithic structure with at least a portion of the piston body C700, such as to define at least a portion of the expansion chamber A221. In some embodiments, the heater body C100 further defines at least a portion of the working fluid body C108, such as to define a unitary or monolithic structure with the working fluid body C108, such as further described herein. In one embodiment, such as further shown and described in regard to FIG. 1.5.1, the system A10 includes the hot side heat exchanger or working fluid body C108 positioned between the heater body C100 and the expansion chamber A221 of the piston body C700. In various embodiments, such as further shown and described in regard to FIG. 1.5.1, the working fluid body C108 includes a plurality of heater conduits or working fluid pathways C110 extended from the expansion chamber A221.

The engine A100 defines an outer end A103 and an inner end A104 each relative to a lateral direction L. The outer ends A103 define laterally distal ends of the engine A100 and the inner ends 104 define laterally inward or central positions of the engine A100. In one embodiment, such as depicted in regard to FIG. 1.3.1-FIG. 1.3.2, the heater body C100 is positioned at outer ends A103 of the system A10. The piston body C700 includes a dome structure A26 at the expansion chamber A221. The expansion chamber dome structure A26 provides reduced surface area heat losses across the outer end A103 of the expansion chamber A221. In various embodiments, the pistons A1011 of the piston assembly A1010 further include domed pistons A1011 corresponding to the expansion chamber A221 dome. The dome structure A26, the domed piston A1011, or both may provide higher compressions ratios at the chambers A221, A222, such as to improve power density and output.

The chiller assembly A40 is positioned in thermal communication with each compression chamber A222. Referring to FIG. 1.3.1-FIG. 1.3.2, the chiller assembly A40 is positioned inward along the lateral direction L relative to the heater body C100. In one embodiment, the chiller assembly A40 is positioned laterally between the heater body C100 and the load device c092 along the lateral direction L. The chiller assembly A40 provides the chiller working fluid in thermal communication with the engine working fluid at the cold side heat exchanger A42 and/or compression chamber A222. In various embodiments, the piston body C700 defines the cold side heat exchanger A42 between an inner volume wall A46 and an outer volume wall A48 surrounding at least the compression chamber A222 portion of the piston body C700.

In various embodiments, such as depicted in regard to FIG. 1.3.1-FIG. 1.3.2, the load device c092 is positioned at the inner end A104 of the system A10 between laterally opposing pistons A1011. The load device c092 may further include a machine body c918 positioned laterally between the piston bodies C700. The machine body c918 surrounds and houses the stator assembly A182 of the load device c092 defining the electric machine. The machine body c918 further surrounds the dynamic member A181 of the electric machine attached to the connection member A1030 of the piston assembly A1010. In various embodiments, such as depicted in regard to FIG. 1.3.1-FIG. 1.3.2, the machine body c918 further provides an inner end wall A50 at the compression chamber A222 laterally distal relative to the expansion chamber A221 dome.

Referring now to FIG. 1.4.1-FIG. 1.4.7, exemplary embodiments of a portion of the piston body C700, cold side heat exchanger A42, and chiller assembly A40 are provided. In various embodiments, the system A10 includes the cold side heat exchanger A42 further including a plurality of chiller conduits A54 each defining chiller passages A56 providing fluid communication of the engine working fluid through the chiller conduit A54 and the compression chamber A222. The piston body C700 includes the outer volume wall A48 and an inner volume wall A46 each separated along a radial direction R perpendicular to the lateral direction L. Each volume wall A46, A48 may be defined at least partially circumferentially relative to a piston body centerline A12 extended through each piston body C700.

In the embodiments depicted in the perspective cutaway views of FIGS. 1.4.1-1.4.2, each volume wall A46, A48 is extended along the lateral direction L. The outer volume wall A48 surrounds the plurality of chiller conduits A54. The plurality of chiller conduits A54 is positioned between the outer volume wall A48 and the inner volume wall A46. The cold side heat exchanger A42 further includes a chamber wall A52 extended between the outer volume wall A48 and the inner volume wall A46. The chamber wall A52, the outer volume wall A48, and the inner volume wall A46 together define a chiller working fluid passage A66 surrounding the plurality of chiller conduits A54. The chiller conduits A54 define walled manifolds fluidly separating the chiller passage A56 (i.e., the passage through which the engine working fluid flows) and the chiller working fluid passage A66 (i.e., the passage through which the chiller working fluid flows). As such, the chiller working fluid flowing through the chiller working fluid passage A66 is fluidly separated from the engine working fluid flowing through the chiller conduits A54. Additionally, the chiller working fluid flowing through the chiller working fluid passage A66 is in thermal communication with the engine working fluid flowing through the chiller conduits A54.

In various embodiments, the chamber wall A52 is extended between the volume walls at an acute angle relative to the lateral direction L along which the piston assembly A1010 is extended. In one embodiment, the chamber wall A52 is extended between 0 degrees and approximately 90 degrees relative to the lateral direction L. In another embodiment, the chamber wall A52 is extended between 30 degrees and approximately 60 degrees relative to the lateral direction L along which the volume walls A46, A48 are substantially extended. In yet another embodiment, the chamber wall A52 is extended approximately 45 degrees relative to the lateral direction L. The chamber wall A52 is further connected to the outer volume wall A48, the inner volume wall A46, and the chiller conduits A54 such as to provide support to one another. The chamber walls A52 extended along an acute angle may further provide advantageous placement of the chiller conduits A54 within the chiller working fluid passage A66 such as to promote thermal energy transfer from the engine working fluid to the chiller working fluid.

During operation of the engine A100, a portion of the engine working fluid is admitted from the compression chamber A222 into the plurality of chiller conduits A54 via the plurality of chiller passage openings A58. The chiller passage opening A58 is defined at a fluid interface of the chiller conduit A54 to the compression chamber A222. In various embodiments, the chiller passage opening A58 provides direct fluid communication with the compression chamber A222. In one embodiment, a distance between the compression chamber A222 of the engine and the cold side heat exchanger A42, or particularly the plurality of chiller conduits A54 in direct thermal communication with the chiller working fluid, is substantially zero. Stated differently, the distance from the compression chamber A222 to the chiller conduits A54 in direct thermal communication with the chiller working fluid (i.e., the chiller working fluid is fluidly contacting an outer wall of the chiller conduits A54 such as to provide direct thermal communication to the engine working fluid within the chiller conduit A54) is the thickness of the chamber wall A52 through which the plurality of chiller passage openings A58 is defined. A distance between the compression chamber A222 and the cold side heat exchanger A42 beyond or greater than the thickness of the chamber wall A52 is approximately zero.

Still further, during operation of engine A100, the compression stroke of the piston assembly A1010 may generally push the engine working fluid through the chiller conduits A54. The engine working fluid within chiller passages A56 in the chiller conduits A54 is in thermal communication with the chiller working fluid surrounding the chiller conduits A54 within the chiller working fluid passage A66. The expansion stroke of the piston assembly A1010 may generally pull the engine working fluid through the chiller conduits A54 such as to egress the engine working fluid from the chiller conduits A54 through the chiller passage openings A58 and into the compression chamber A222. As further described herein, the chiller working fluid passage A66 is in fluid communication with a chiller working fluid outlet opening A78 and a chiller working fluid outlet opening A80 together providing flow of the chiller working fluid such as to remove and displace thermal energy from the engine working fluid at the chiller conduits A54. As still further described herein, the chiller working fluid passage A66, the chiller working fluid outlet opening A78, and/or the chiller working fluid output may form a circuit of the chiller assembly at which thermal energy from the engine working fluid at the compression chamber A222 is released from the closed cycle engine.

An outer chamber wall A53 and at least one chamber wall A52 may together define a chiller collection chamber A62 at which the engine working fluid may egress the plurality of chiller conduits A54 and collect into a volume. The outer chamber wall A53 defines a plurality of chiller collection chamber openings A60 each corresponding to a respective chiller conduit A54 and chiller passage opening A58. As further described herein in regard to FIGS. 1.4.5-1.4.7 and FIGS. 1.7.1-FIG. 1.7.4, the chiller collection chamber A62 is further in fluid communication with a walled conduit A1050 such as to provide fluid communication between the compression chamber A222 of one piston assembly A1010 and the expansion chamber A221 of another piston assembly A1010.

In various embodiments, the compression chamber A222 of one piston assembly A1010 is fluidly connected to the expansion chamber A221 of another piston assembly A1010 via the walled conduit A1050 to provide a balanced pressure and/or balanced phase fluid coupling arrangement of the plurality of chambers A221, A222. An interconnected volume of chambers including the expansion chamber A221 of one piston assembly A1010 and the compression chamber A222 of another piston assembly A1010 defines a fluid interconnection of the chambers A221, A222 at different piston assemblies A1010. The fluid interconnection of chambers A221, A222 at different piston assemblies is such that if there is any fluid communication or fluid leakage path between the expansion chamber A221 and the compression chamber A222 of the same piston assembly A1010, a single fluid loop of connected chambers A221, A222 is provided that is separated from the chambers A221, A222 outside of the interconnected volume of chambers. In one embodiment, the balanced pressure arrangement, or additionally, the balance phase arrangement, of the piston assemblies A1010 is the fluid interconnection of the walled conduits A1050 and the chambers A221, A222 such that the chambers within the interconnected volume are substantially fluidly and/or pneumatically separated from those outside of the interconnected volume to provide a substantially equal and opposite force relative to one another to at least one piston assembly A1010 when the engine working fluid within the chambers A221, A222 is at a uniform temperature. Stated differently, when one piston assembly A1010 is articulated, such as along the lateral direction L, the fluid interconnection of chambers A221, A222 via the walled conduit A1050 provides a substantially net zero force at another piston assembly A1010 when the engine working fluid is at a substantially uniform temperature. As such, when one piston assembly A1010 is articulated under such conditions, adjacent or other piston assemblies A1010 remain stationary due at least to the net zero force at the piston assembly A1010. In various embodiments, the substantially uniform temperature is defined when no heat input or thermal energy is provided from the heater body C100 or working fluids body C108 to the engine working fluid.

Referring now to FIG. 1.4.3, a side cutaway view of an embodiment of a pair of piston bodies C700 is provided. The embodiment depicted in regard to FIG. 1.4.3 is configured substantially similarly as shown and described in regard to FIGS. 1.4.1-1.4.2. FIG. 1.4.3 further provides a partial cutaway view within the piston body C700 exposing a portion of the plurality of chiller conduits A54 between the volume walls A46, A48. In various embodiments, the chiller conduit A54 extends along the lateral direction L between the chiller passage opening A58 and the chiller collection chamber A62. In one embodiment, the chiller conduit A54 extends at least partially along an oblique or orthogonal direction relative to the lateral direction L. In various embodiments, the chiller conduit A54 extends substantially circumferentially around the piston body C700. The chiller conduit A54 may extend at least partially along the oblique or orthogonal direction relative to the lateral direction L such as to desirably increase a surface area of the chiller passage A56 defined within the chiller conduit A54 at which the engine working fluid is in thermal communication with the chiller working fluid in the cold side heat exchanger A42. The desirable increase in surface area of the chiller passage A56 defined by the chiller conduit A54 provides the surrounding chiller working fluid in the first and second chiller working fluid passage A68, A70 to be in thermal communication so as to improve the opportunity for the transfer of thermal energy from the engine working fluid to the chiller working fluid. In one embodiment, the surface area over which the engine working fluid is desirably in thermal communication with the surrounding chiller working fluid is desirably adjusted by adjusting the lateral, circumferential, or orthogonal extension of the chiller conduits A54 such as to adjust the heat exchanging surface area of the chiller passage A56. In one embodiment, the chiller conduit A54 may extend at least partially in a curved or circumferential or spiral direction, such as a helix, between the chiller passage opening A58 and the chiller collection chamber A62. In another embodiment, the chiller conduit A54 may extend in a zig-zag or serpentine pattern between the chiller passage opening A58 and the chiller collection chamber A62. However, it should be appreciated that other geometries may be defined such as to produce the desired heat exchanging surface area of the chiller conduit A54 relative to the chiller working fluid passage A66.

It should be appreciated that in various embodiments the surface area of the chiller passage A56 defined within each chiller conduit A54 described herein corresponds to the chiller passage A56, such as an internal wall or surface of the chiller conduit A54 at which the engine working fluid is in direct contact. In one embodiment, the surface area defines a nominal surface area of the chiller passage A56, such as a cross section of the chiller conduit A54. In other embodiments, features may be added or altered to the chiller passage A56 within the chiller conduit A54, such as, but not limited to, surface roughness, protuberances, depressions, spikes, nodules, loops, hooks, bumps, burls, clots, lumps, knobs, projections, protrusions, swells, enlargements, outgrowths, accretions, blisters, juts, and the like, or other raised material, or combinations thereof, to desirably alter flow rate, pressure drop, heat transfer, flow profile or fluid dynamics of the engine working fluid.

Referring still to FIG. 1.4.3, various embodiments further include a connecting chiller conduit A72 extended between the first piston body C700 and the second piston body C700. The connecting chiller conduit A72 provides fluid communication of the chiller working fluid between two or more piston bodies C700. In various embodiments, the chiller working fluid passage A66 at each piston body C700 includes a first chiller working fluid passage A68 and a second chiller working fluid passage A70 each in thermal communication with the compression chamber A222. The second chiller working fluid passage A70 is positioned proximal to the chiller passage opening A58 at the compression chamber A222. The first chiller working fluid passage A68 is positioned distal to the chiller passage opening A58 at the compression chamber A222. Additionally, or alternatively, the first chiller working fluid passage A68 is positioned proximal to the chiller collection chamber A62 or the expansion chamber A221. The connecting chiller conduit A72 is configured to fluidly connect the first chiller working fluid passage A68 of one piston body C700 (e.g., the first piston body 82) to the second chiller working fluid passage A70 of another piston body C700 (e.g., the second piston body 84), such as further depicted in the embodiments in regard to FIGS. 1.4.4-1.4.7. As further shown and described in regard to FIGS. 1.4.4-1.4.7 and FIGS. 1.7.1-FIG. 1.7.4, the chiller working fluid may enter the chiller assembly A40 and flow at the first chiller working fluid passage A68 of one piston body C700 and the second chiller working fluid passage A70 of another piston body C700. Stated differently, in various embodiments, the chiller working fluid may enter the chiller assembly A40 and flow in thermal communication with a generally hotter portion of one piston body C700 (i.e., proximate along the lateral direction L to the expansion chamber A221) and engine working fluid positioned proximal to the hot or expansion chamber A221. The chiller working fluid may then flow to another piston body C700 to a portion distal to the hot or expansion chamber A221 of the other piston body C700, such as may be generally cooler relative to first piston body C700.

Referring now to FIG. 1.4.4, a perspective view of an exemplary embodiment of a portion of the engine A100 is provided. Referring additionally to FIGS. 1.4.5-1.4.6, further embodiments of the portion of the engine A100 are provided. FIG. 1.4.4 includes a partial cutaway view within the piston body C700 exposing chiller conduits A54 between the volume walls A46, A48. FIG. 1.4.4 depicts at least a pair of the piston bodies C700 including the connecting chiller conduit A72 such as to provide fluid communication and thermal communication from the first chiller working fluid passage A68 of the first piston body C700 to the second chiller working fluid passage A70 of the second piston body C700. Additionally, the second piston body C700 includes the connecting chiller conduit A72 providing fluid communication and thermal communication from the first chiller working fluid passage A68 of the second piston body C700 to another adjacent second chiller working fluid passage A70 of another adjacent piston body C700 different from the first piston body C700 and the second piston body C700.

Referring to FIG. 1.4.5, a top-down view of an exemplary embodiment of the portion of the engine depicted in FIG. 1.4.4 is provided. Referring additionally to FIG. 1.4.6, a bottom-up view of an exemplary embodiment of the portion of the engine depicted in FIG. 1.4.4 is provided. Referring to FIGS. 1.4.5-1.4.6, the embodiments further depict the connecting chiller conduit A72 extended between pairs of the piston body C700. In one embodiment, such as depicted in regard to FIGS. 1.4.5-1.4.6, the engine includes a chiller working fluid inlet opening A78 through which chiller working fluid is provided to the chiller working fluid passage A66. The chiller working fluid inlet opening A78 may be positioned generally inward within the engine or proximal to the reference longitudinal axis C204. Referring to FIG. 1.4.6, in one embodiment, the chiller working fluid passage A66 may define a flowpath from the chiller working fluid inlet opening A78 and at least partially around one piston body C700. The flowpath may further extend across the connecting chiller conduit A72 to another or second piston body 84 adjacent or next to the first piston body 82. The flowpath of the chiller working fluid passage A66 further extends substantially circumferentially around the other piston body C700 (e.g., depicted at the second piston body C700). The flowpath is in fluid communication with a chiller working fluid outlet opening A80. In various embodiments, the chiller working fluid outlet opening A80 is positioned outward or distal from the reference longitudinal axis C204.

In various embodiments, the flowpath of the chiller working fluid passage A66 extends from the chiller working fluid inlet opening A78 at least partially circumferentially around one piston body C700 and further across the connecting chiller conduit A72 to extend at least partially circumferentially, or substantially circumferentially, around another or adjacent piston body C700. Similarly, the other or second piston body C700 includes the chiller working fluid opening and flowpath extended at least partially circumferentially to the connecting chiller conduit A72 to provide fluid communication and thermal communication to yet another piston body C700 and circumferentially around the yet another piston body C700 to the chiller working fluid outlet opening A80.

In still various embodiments, the chiller working fluid inlet opening A78, the chiller working fluid outlet opening A80, or both extend at least partially along the lateral direction L or orthogonal to the flowpath of the chiller working fluid passage A66 such as to ingress and egress the chiller working fluid through the chiller working fluid passage A66.

In one embodiment, the engine includes the chiller working fluid inlet opening A78 corresponding to each piston body C700. Additionally, or alternatively, the engine includes the chiller working fluid outlet opening A80 corresponding to each piston body C700. It should further be appreciated that in various embodiments, the flowpath of the chiller working fluid passage A66 extends at least partially along the lateral direction L such as shown and described in regard to FIG. 1.4.3. As further described in various embodiments herein, the flowpath arrangement shown and described in regard to FIGS. 1.4.3-1.4.7 provides thermal communication of the chiller working fluid with the engine working fluid, such as the engine working fluid within the chiller conduits A54 at each piston body C700. Furthermore, the flowpath arrangements shown and described in regard to FIGS. 1.4.3-1.4.7 further provide a desired amount of heat exchanging surface area for thermal energy transfer from the engine working fluid to the chiller working fluid. As such, embodiments of the chiller conduits A54, the chiller working fluid passage A66, or both, may provide an improved transfer of thermal energy from the engine working fluid to the chiller working fluid. Further still, embodiments of the chiller conduits A54, the chiller working fluid passage A66, or both, may desirably increase a temperature differential of the engine working fluid from the cold or compression chamber A222 relative to the hot or expansion chamber A221. Additionally, or alternatively, embodiments of the chiller conduits, A54, the chiller working fluid passage A66, or both, may desirably a stroke or cycle time or period of the engine A100.

Referring now to FIG. 1.4.7, a cutaway perspective view of an exemplary embodiment of the portion of the engine A100 depicted in FIG. 1.4.4 is provided. The exemplary embodiment in regard to FIG. 1.4.7 may be configured substantially similarly as shown and described in regard to FIGS. 1.4.1-1.4.6. The cutaway view further depicts the chiller conduit A54 surrounded by the chiller working fluid passage A66. The embodiment in regard to FIG. 1.4.7, and further depicted at least in part in FIGS. 1.4.5-1.4.6, a portion of the walled conduit A1050 is extended through the engine A100 inward of the plurality of piston bodies C700 relative to the radial direction R from the longitudinal axis C204. In one embodiment, such as depicted in regard to FIG. 1.4.7, the plurality of walled conduits A1050 is extended proximal to a reference longitudinal axis C204, such as inward of the piston bodies C700 along a radial direction R relative to the longitudinal axis C204. However, in other embodiments, such as depicted in regard to FIG. 1.7.1 through FIG. 1.7.4, the walled conduits A1050 may extend outward of the piston bodies C700, such as outward along the radial direction R relative to the longitudinal axis C204.

Referring now to FIG. 1.4.8, a perspective view of another exemplary embodiment of the engine A100 is provided. The perspective view in FIG. 1.4.8 further includes a partial cutaway view within the piston body C700 exposing the chiller working fluid passage A66 and chiller conduits A54. The embodiment provided in regard to FIG. 1.4.8 is configured substantially similarly as shown and described in regard to FIGS. 3-1.4.7. In FIG. 1.4.8, the chiller working fluid passage A66 depicts a single or common chiller working fluid inlet opening A78 from which the chiller working fluid passage A66 provides separate flowpaths to each piston body C700. The chiller working fluid passage A66 further depicts a single or common chiller working fluid outlet opening A80 at which the chiller working fluid passage A66 re-combines the separated chiller working fluid passages A66 before egressing the chiller working fluid through the single chiller working fluid outlet opening A80.

Referring to FIG. 1.4.8, the chiller working fluid passage A66 at the chiller working fluid inlet opening A78 separates into the shorter chiller working fluid flowpath provided to piston bodies C700 proximate to the chiller working fluid inlet opening A78. The chiller working fluid passage A66 at the chiller working fluid inlet opening A78 further separates into the longer chiller working fluid flowpath provided to piston bodies C700 distal to the chiller working fluid inlet opening A78.

In various embodiments, the piston bodies C700 distal to the chiller working fluid inlet opening A78 additionally are proximate to the chiller working fluid outlet opening A80. The shorter chiller working fluid flowpath provides the shorter flowpath from the piston body C700 proximate to the chiller working fluid outlet opening A80. The chiller working fluid flowpath A66 further provides the longer flowpath (relative to the first chiller working fluid flowpath) from the piston body C700 distal to the chiller working fluid outlet opening A80.

In one embodiment, the piston body C700, such as proximate to the chiller working fluid inlet opening A78, receives chiller working fluid via the shorter chiller working fluid flowpath and egresses chiller working fluid via the longer chiller working fluid flowpath. Alternatively, the piston body C700, such as proximate to the chiller working fluid outlet opening A80, receives chiller working fluid via the longer chiller working fluid flowpath and egresses chiller working fluid via the shorter chiller working fluid flowpath. Altogether, the chiller working fluid passage A66 may define a substantially equal volume flowpath at each piston body C700 between the chiller working fluid inlet opening A78 and the chiller working fluid outlet opening A80. The substantially equal volume arrangement may provide a substantially even thermal energy transfer from the engine working fluid at each piston body C700 to the chiller working fluid.

Referring still to FIG. 1.4.8, in one embodiment, the chiller working fluid passage A66 at least partially circumferentially surrounds each piston body C700. Still further, the chiller working fluid passage A66 is extended along the lateral direction L or otherwise co-directional to the piston body C700 such that the chiller working fluid surrounds the piston body C700.

In various embodiments, such as depicted in regard to FIG. 1.4.8, the chiller conduit A54 is extended from the compression chamber A222 along a first lateral direction and extends along a second lateral direction opposite of the first lateral direction. The chiller conduit A54 includes an approximately 180 degree turn between the chiller passage opening A58 and the chiller collection chamber A62. The chiller working fluid passage A66 further surrounds the chiller conduit A54 along the lateral direction L. In various embodiments, such as depicted in FIG. 1.4.8, the chiller working fluid passage A66 further surrounds the 180 degree turn portion of the chiller conduit A54. The chiller passage openings A58 may generally be positioned such as to prevent the piston A1011 of the piston assembly A1010 from covering or otherwise obscuring the chiller passage openings A58 during operation of the system A10.

During operation, chiller working fluid flowing through the chiller working fluid passage A66 may receive thermal energy from the engine working fluid within one or more of the chiller conduits A54. The rate or quantity of thermal energy transferring from the engine working fluid to the chiller working fluid within the chiller working fluid passage A66 may vary as between respective portions of the chiller working fluid passage A66, such as shown and described in regard to the first chiller working fluid passage A68 and the second chiller working fluid passage A70, and/or between respective piston bodies (e.g., the first piston body and the second piston body). For example, the rate or quantity of thermal energy transferring from the engine working fluid to the chiller working fluid passage A66 may depend at least in part on a temperature gradient between the chiller conduit A54 and the chiller working fluid passage A66, such as a temperature gradient between the engine working fluid and the chiller working fluid. In some embodiments, however, the engine working fluid within the plurality of chiller conduits A54 may exhibit a temperature that differs as between at least two piston bodies C700 (e.g., first piston body and second piston body) and/or as between at least two portions along the lateral extension of the chamber 222 (i.e., temperature gradient of the chamber 222 along the lateral direction L) within a given piston body. Additionally, or in the alternative, the engine working fluid within the plurality of piston bodies C700 may exhibit a temperature that differs as between at least two piston bodies. For example, the engine working fluid within the plurality of chiller conduits A54 corresponding to one piston body (e.g., the first piston body) may exhibit a temperature different from the plurality of chiller conduits A54 corresponding to another piston body (e.g., the second piston body) based at least on the phase difference of the piston assemblies A1010 within the respective piston bodies during operation of the engine.

In some embodiments, the temperature of the chiller working fluid may increase as the chiller working fluid flows through the chiller working fluid passage A66 and receives thermal energy from the engine working fluid within the chiller conduits A54. In one embodiment, as depicted in regard to FIGS. 1.4.3-1.4.7, the chiller working fluid passage A66 extending at least partially circumferentially around one piston body (e.g., the first piston body), and further extended at least partially circumferentially around one or more other piston bodies (e.g., the second piston body) includes the chiller working fluid increasing in temperature by receiving thermal energy at one piston body.

In some embodiments, engine working fluid flowing from a first piston body flowing to another or second piston body may exhibit a temperature that differs from the engine working fluid flowing in an opposite direction, from the other piston body to the first piston body.

In various embodiments, the chiller working fluid and the engine working fluid may exhibit a temperature gradient that depends at least in part on whether the engine working fluid is flowing towards one piston body or another piston body. For example, a first temperature gradient may correspond to the engine working fluid flowing towards one piston body and a second temperature gradient may correspond to the engine working fluid flowing towards another piston body. In some embodiments the first temperature gradient may be smaller than the second temperature gradient. In other embodiments the second temperature gradient may be greater than the first temperature gradient. For example, the first temperature gradient may be smaller than the second temperature gradient at least in part because of the temperature of the engine working fluid flowing towards one piston body is greater than the temperature of engine working fluid flowing towards the other piston body.

In some embodiments, the rate and/or quantity of thermal energy transfer from the engine working fluid to the chiller working fluid may depend on whether the engine working fluid defines the first temperature gradient or the second temperature gradient. For example, a first rate and/or quantity of thermal energy transfer from the engine working fluid to the chiller working fluid may correspond to engine working fluid flowing towards one piston body and a second rate and/or quantity of thermal energy transfer from the engine working fluid to the chiller working fluid may correspond to the engine working fluid flowing towards another piston body. In some embodiments the first rate and/or quantity of thermal energy transfer may be smaller than the second rate and/or quantity of thermal energy transfer. In other words, the second rate and/or quantity of thermal energy transfer may be greater than the first rate and/or quantity of thermal energy transfer. For example, the first rate and/or quantity of thermal energy transfer may be smaller than the second rate and/or quantity of thermal energy transfer at least in part because of the first temperature gradient corresponding to engine working fluid flowing towards one piston body being smaller than the second temperature gradient corresponding to engine working fluid flowing towards another piston body.

In some embodiments, the efficiency of thermal energy transfer from the engine working fluid to the chiller working fluid may be enhanced at least in part by the second rate and/or quantity of thermal energy transfer corresponding to the engine working fluid flowing towards the first piston body being greater than the first rate and/or quantity of thermal energy transfer corresponding to the engine working fluid flowing towards second piston body. For example, in this way, a relatively larger proportion of the thermal energy input from the chiller conduits A54 may be applied to the chiller working fluid as the chiller working fluid flows from one piston body to another piston body to which the chiller working fluid passage A66 is thermally coupled (i.e., via the connecting chiller conduit A72). The thermal energy input to the chiller working fluid during the cycle of the piston assembly in a first direction (e.g., downstroke portion of the stroke cycle) may contribute to the downstroke (e.g., directly) by further cooling and thereby further contracting the engine working fluid. During another portion of the engine cycle (e.g., the upstroke portion of the stroke cycle), a relatively smaller proportion of the thermal input by the engine working fluid in the chiller conduits A54 may be applied to the chiller working fluid, which may reduce or mitigate a potential for thermal energy output from the engine working fluid to counteract the upstroke by further heating and thereby contracting the engine working fluid, providing an additional or alternative efficiency enhancement. With a relatively smaller proportion of the thermal energy input by the chiller conduits A54 applied to the chiller working fluid during the upstroke, a smaller portion of the thermal energy input may be transferred to the chiller working fluid.

As the chiller working fluid flows through the chiller working fluid passage A66, thermal energy may preferentially transfer to the chiller working fluid within the chiller working fluid passage A66 where the temperature gradient is larger or largest, thereby preferentially providing thermal energy to the chiller working fluid at the walled conduit and/or first or second chiller working fluid passage A70 where there is a greater capacity to receive thermal energy from the engine working fluid. For example, the first chiller working fluid passage A68, positioned more proximate to the expansion chamber A221 than the second chiller working fluid passage A70, may exhibit a larger temperature gradient between the engine working fluid and the chiller working fluid. The second chiller working fluid passage A70, positioned distal to the expansion chamber A221 relative to the first chiller working fluid passage A68, may exhibit a lower temperature gradient between the engine working fluid and the chiller working fluid. Additionally, such as described herein, the chiller working fluid passage A66 at one piston body may exhibit a larger temperature gradient than another piston body to which the chiller working fluid passage A66 is thermally coupled (i.e., via the connecting chiller conduit A72), such as based on the cycle or stroke of the engine during operation. Still further, the temperature gradient at the first chiller working fluid passage A68 at one piston body may be different (e.g., greater or lesser) than the second chiller working fluid passage A70 at another piston body to which the chiller working fluid passage A66 is thermally coupled, such as due at least in part to the cycle or stroke of the engine. As such, thermal energy may preferentially transfer from the engine working fluid to the chiller working fluid based at least on the larger temperature gradient at any time during the cycle of the engine.

It should be appreciated that embodiments of the chiller assembly including the chiller working fluid passage A66 and the cold side heat exchanger A42 may function substantially similarly as shown and described by embodiments of the hot side heat exchanger C108 provided herein.

Now referring to FIG. 1.5.1, an exemplary embodiment of the working-fluid body c108 is provided. The presently disclosed working-fluid bodies c108 may define part of the heater body c100 the piston body C700. The working fluid body C108 includes a plurality of heater conduits or working-fluid pathways C110 through which engine working fluid flows between the expansion chamber A221 and the compression chamber A222.

The plurality of working-fluid pathways c110 may extend between respective ones of a plurality of a first opening or piston chamber apertures c111 and respective ones of a plurality of a second opening or regenerator apertures c113. The piston chamber apertures c111 provide fluid communication between the working-fluid pathways c110 and the piston chamber c112, and the regenerator apertures c113 provide fluid communication between the working-fluid pathways c110 and the regenerator conduit c1000. The piston chamber apertures c111 may define a first end of the working-fluid pathways c110 and the regenerator apertures c113 may define a second end of the working-fluid pathways c110.

Operation of the engine A100 and system A10 includes the plurality of piston assemblies A1010 moving in cyclic operation, such as in back and forth movement between the piston body c700 at the first end A101 and another piston body c700 at the second end A102 (FIG. 1.3.1). Pressure increases and decreases at respective chambers A221, A222 correspond to movement of the piston assemblies A1010, such as further described herein. In exemplary embodiments such as depicted in regard to FIG. 1.3.1. or FIG. 1.7.1, the plurality of piston bodies c700 may include the expansion chamber A221 and the compression chamber A222 defined at each end A101, A102 of each piston assembly A1010, such as to provide eight each of the expansion chamber A221 and the compression chamber A222 at four piston assemblies A1010. The plurality of piston assemblies A1010 may be disposed radially relative to the longitudinal axis C204.

The plurality of working fluid pathways C110 extend in fluid communication from a expansion chamber A221 to the walled conduit A1050. In various embodiments, such as further described herein, the working fluid pathways C110 extend in fluid communication from the expansion chamber A221 to a corresponding regenerator body C800 at the walled conduit A1050. A first plurality of heater conduits or working-fluid pathways C110 may fluidly communicate between an expansion chamber A221 defined by a first piston body C700 and a first compression chamber A222 defined by another piston body C700 different from the first piston body C700 (e.g., not the first piston body). A second plurality of working-fluid pathways C110 may fluidly communicate between a second expansion chamber A221 (i.e., different from the first expansion chamber) defined by a second piston body c700 and a compression chamber A222 defined by another piston body C700 (e.g., not the second piston body).

Fluid communication between the expansion chamber A221 of one piston body C700 and the compression chamber A222 of another piston body C700 through the heater conduits or working fluid pathways C110 provides for the engine working fluid to be in thermal communication with the heating working fluid surrounding the working fluid pathways C110. For example, the heating working fluid, such as described herein, is provided in thermal and/or fluid communication around the working fluid pathways C110. The working fluid pathways C110 fluidly separate the heating working fluid and the engine working fluid while further providing heat transfer between the heating working fluid and the engine working fluid (e.g., heat transfer from the heating working fluid to the engine working fluid).

The engine working fluid is heated at least at the working fluid pathways C110 and provides for pressure change at the respective expansion chamber A221 (e.g., pressure increase at the expansion chamber A221). Based at least on the engine cycle, such as the movement of the piston assemblies A1010, pressure changes at the engine working fluid between the fluidly connected expansion chamber A221 and the compression chamber A222 via the heater conduit or working fluid pathways C110 correspond to heat transfer to the engine working fluid from the heating working fluid. As further described herein, based at least on the engine cycle, heat transfer, or an amount of heat transferred, to the engine working fluid may be based on the engine cycle. For example, the amount of heat transferred to the engine working fluid may correspond to whether the expansion chamber A221 is increasing in pressure or decreasing in pressure, or whether a corresponding fluidly connected compression chamber A222 is decreasing in pressure or increasing in pressure.

As further described herein, the plurality of heater conduits or working fluid pathways C110 beneficially provides for heat exchange, such as heat transfer to from the heating working fluid to the engine working fluid. The plurality of working fluid pathways C110 provides a desired amount of heat transfer to the engine working fluid, such as to improve operation of the engine A100. Improved operation of the engine A100 may include improved power output, improved power density, and/or improved efficiency of the engine A100.

Now referring to FIGS. 1.6.1 through 1.6.6D, exemplary regenerator bodies c800 will be described. The presently disclosed regenerator bodies c800 may define part of the heater body c100 and/or an engine c002, such as shown and described in regard to system A10 and engine A100 herein. For example, a regenerator body c800 may define at least a portion of a monolithic body or a monolithic body-segment. Such monolithic body or monolithic body-segment may define at least a portion of the heater body c100 and/or the engine c002. Additionally, or in the alternative, the presently disclosed regenerator bodies c800 may be provided as a separate component, whether for use in connection with a heater body c100, an engine c002, or any other setting whether related or unrelated to a heater body c100 or an engine c002. It will be appreciated that an engine c002 and/or a heater body c100 may include any desired number of regenerator bodies c800.

FIG. 1.6.1A through 1.6.1D show an exemplary regenerator body c800 implemented within an exemplary engine c002. The regenerator body c800 may fluidly communicate with one or more piston bodies c700. For example, a plurality of working-fluid pathways c110 may provide fluid communication between a regenerator body c800 and a piston body c700. The working-fluid pathways c110 may fluidly communicate between a piston chamber c112 defined by the piston body c700 and a regenerator conduit c1000 defined by the regenerator body c800.

The plurality of working-fluid pathways c110 may extend between respective ones of a plurality of piston chamber apertures c111 and respective ones of a plurality of regenerator apertures c113. The piston chamber apertures c111 provide fluid communication between the working-fluid pathways c110 and the piston chamber c112, and the regenerator apertures c113 provide fluid communication between the working-fluid pathways c110 and the regenerator conduit c1000. The piston chamber apertures c111 may define a first end of the working-fluid pathways c110 and the regenerator apertures c113 may define a second end of the working-fluid pathways c110.

A piston body c700 may define a hot-side c1002 of the piston chamber c112 and a cold side piston chamber c1004. A regenerator conduit c1000 may include a hot-side portion c1006 and a cold-side portion c1008. A plurality of hot-side working-fluid pathways c1010 may provide fluid communication between the regenerator body c800 and a first piston body c700, such as between the hot-side portion c1006 and the hot-side c1002 of the piston chamber c112. A plurality of cold-side working-fluid pathways c1010 may provide fluid communication between the regenerator body c800 and a second piston body c700, such as between the cold-side regenerator conduit c1008 the cold-side c1004 of the piston chamber c112.

The first piston body c700 may include a first piston assembly c090 disposed therein and/or the second piston body c700 may include a second piston assembly c090 disposed therein. Heat may be input ($Q_{IN}$) to engine-working fluid disposed within the hot-side working-fluid pathways c1010, such as from a heater body c100 or any other suitable heat source. Heat may be extracted ($Q_{OUT}$) from engine-working fluid disposed within the cold-side working-fluid pathways c1012, such as from a chiller body (not shown) or any other suitable cooling source. A regenerator body c800 may be disposed adjacent to a piston body c700, such as circumferentially adjacent to a piston body c700. As shown in FIG. 1.6.1C, a regenerator body c800 may circumferentially surround a piston body c700. Alternatively, a regenerator body c800 may be disposed adjacent to a piston body c700. In some embodiments, a semi-annular regenerator body c800 may be disposed circumferentially adjacent to a piston body c700.

During operation, engine-working fluid flowing from the plurality of hot-side working-fluid pathways c1010 to the regenerator body c800 enters the regenerator conduit c1000. Fluid passing through the regenerator conduit c1000 may flow out of the regenerator body c800 and into the plurality of cold-side working-fluid pathways c1012. The regenerator conduit c1000 includes a heat storage medium c1014 disposed therein. The heat storage medium c1014 may be any suitable thermal energy storage medium within which heat from the hot-side working-fluid pathways c1010 may be intermittently stored as the engine-working fluid flows from the regenerator body c800 to the cold-side working-fluid pathways c1012. In some embodiments, the heat storage medium c1014 may include a plurality of fin arrays c1016; however, other heat storage medium may additionally or alternatively be utilized, including sensible heat storage and/or latent heat storage technologies. Other suitable heat storage medium may include packed beds, include molten salts, miscibility gap alloys, silicon materials (e.g., solid or molten silicon), phase change materials, and so forth.

The plurality of fin arrays c1016 include an array of high-surface area heat transfer fins having a thermally conductive relationship with engine-working fluid in the regenerator conduit c1000. As fluid flows from the hot-side working-fluid pathways c1010 into or through the regenerator conduit c1000, heat transfers to the heat storage medium 1014 (e.g., the plurality of fin arrays c1016), preserving thermal energy from being extracted ($Q_{OUT}$) at the chiller body (not shown) or other suitable cooling source. As fluid flows from the cold-side working-fluid pathways c1012 into or through the regenerator conduit c1000, heat transfers from the heat storage medium 1014 (e.g., the plurality of fin arrays c1016) back to the engine-working fluid, thereby returning thermal energy to the engine-working fluid flowing into the hot-side working-fluid pathways c1010.

Still referring to FIG. 1.6.1A, in some embodiments, a heat storage medium c1014 may include a plurality of fin arrays c1016 adjacently disposed within a regenerator conduit c1000. The plurality of fin arrays c1016 may be respectively supported by the regenerator conduit c1000 in spaced relation to one another. The spaced relation of the plurality of fin arrays c1016 may define a gap, G c1018 longitudinally separating adjacent ones of the plurality of fin arrays c1016.

Referring again to FIG. 1.6.1A, in some embodiments, a regenerator body c800 may include a hot-side portion c1006 and a cold-side portion c1008. The hot-side portion c1006 may be operably coupled and fluidly communicate with the cold-side portion c1008. The hot-side portion c1006 of the regenerator body c800 may include a hot-side regenerator conduit c1038 and a hot-side plurality of fin arrays c1040 adjacently disposed within the hot-side regenerator conduit c1038 in spaced relation to one another. The cold-side portion c1008 of the regenerator body c800 may include a cold-side regenerator conduit c1042 and a cold-side plurality of fin arrays c1044 adjacently disposed within the cold-side regenerator conduit c1042 in spaced relation to one another.

The hot-side portion c1006 and the cold-side portion c1008 of the regenerator body c800 may be separated by a hot-to-cold gap H-C c1046. For example, in some embodiments, the spaced relation (e.g., the hot-to-cold gap H-C c1046) of the hot-side plurality of fin arrays c1040 to the cold-side plurality of fin arrays c1044 may define a hot-to-cold gap H-C c1046 longitudinally separating the hot-side plurality of fin arrays c1040 from the cold-side plurality of fin arrays c1042. Additionally, or in the alternative, the hot-side regenerator conduit c1038 and the cold-side regenerator conduit c1042 may be in the spaced relation to one another, further defining the hot-to-cold gap H-C c1046. The hot-to-cold gap H-C c1046 may reduce or minimize thermally conductive heat transfer between the hot-side portion c1006 and the cold-side portion c1008 of the regenerator body c800. In some embodiments, the hot-to-cold gap H-C c1046 may allow a regenerator body c800 to provide at least two thermally distinct thermal storage bodies within the same regenerator body c800.

As described herein, at least a portion of a regenerator body c800 may define an additively manufactured monolithic body or an additively manufactured monolithic body-segment. The regenerator body c800 may define a portion of a larger monolithic body or monolithic body segment, or the regenerator body c800 may define a module insertable into a monolithic body or a monolithic body-segment. In some embodiments, the plurality of fin arrays c1016 may be monolithically integrated with the regenerator conduit c100. For example, the array of interconnected fins c1056 and fin supports c1058 may define a monolithic structure such as a portion of a monolithic body or monolithic body-segment.

A regenerator body c800 may be formed of one or more materials selected at least in part on one or more thermal storage properties. For example, one or more materials may be selected for a regenerator body c800 based at least in part on a thermal conductivity and/or a heat capacity of the material. In some embodiments, the plurality of fin arrays c1016 may include a first material and the regenerator conduit may include a second material that differs from the first material. For example, the thermal conductivity of the first material may exceed the thermal conductivity of the second material. Additionally, or in the alternative, the heat capacity of the first material may exceed the heat capacity of the second material. In some embodiments, the plurality of fin arrays c1016 may include a material selected for thermal conductivity and/or the regenerator conduit c1000 may include a material selected for thermal resistivity. In an exemplary embodiment, the plurality of fin arrays c1016 may include a metal or metal alloy, and the regenerator conduit c1000 may include a ceramic. In other embodiments, the regenerator conduit c1000 may additionally or alternatively include a metal or metal alloy, and/or the plurality of fin arrays c1016 may include a ceramic.

Exemplary metal or metal alloys may be selected for high thermal conductivity and/or heat capacity properties. Suitable metal or metal alloys may include copper, aluminum, tin, zinc, nickel, chromium, titanium, tellurium, magnesium, and/or iron. In some embodiments, the metal or metal alloy may include a rare earth element. Exemplary copper alloys may include CuSn, CuZn, CuZnAs, CuZnP, CuZnFe, CuZnNi, CuCr, and/or CuTeSn.

Exemplary ceramics may be selected for low thermal conductivity and/or heat capacity properties. Suitable ceramics may include alumina, beryllia, ceria, and/or zirconia. In some embodiments, the ceramic may include a carbide, a boride, a nitride, and/or a silicide.

It should be appreciated that in various embodiments the surface area within the heater conduits or working-fluid pathways C110 corresponds to an internal wall or surface of the heater conduit C110 at which the engine working fluid is in direct contact. In one embodiment, the surface area defines a nominal surface area of the working-fluid pathway C110, such as a cross sectional area within the working-fluid pathway C110. In other embodiments, features may be added or altered to the working-fluid passage C110 within the heater conduit, such as, but not limited to, surface roughness, protuberances, depressions, spikes, nodules, loops, hooks, bumps, burls, clots, lumps, knobs, projections, protrusions, swells, enlargements, outgrowths, accretions, blisters, juts, and the like, or other raised material, or combinations thereof, to desirably alter flow rate, pressure drop, heat transfer, flow profile or fluid dynamics of the engine working fluid.

The cross sectional view provided in FIG. 1.3.1 is cut along the lateral direction L such as to depict two of four piston assemblies A1010 of the system A10. In various embodiments, the system A10 provided in regard to FIG. 1.3.1 further includes the walled conduits A1050 disposed inward of the piston bodies C700 proximate to the reference longitudinal axis C204, such as shown and described in regard to FIGS. 1.4.5-1.4.7. In other embodiments, the system A10 provided in regard to FIG. 1.3.1 further includes the walled conduits A1050 disposed outward of the piston bodies C700, such as shown and described in regard to FIG. 1.7.1 through FIG. 1.7.4.

Referring to FIG. 1.7.1 through FIG. 1.7.4, side, end, and perspective views of a portion of the system A10 are provided. The embodiments provided in regard to FIG. 1.7.1 through FIG. 1.7.4 are configured substantially similarly as shown and described in regard to FIG. 1.3.1-FIG. 1.3.2. In regard to FIGS. 1.7.1-FIG. 1.7.4, the portions of the system A10 depicted therein include four piston assemblies A1010 positioned within eight respective piston bodies C700. The piston bodies C700 may generally include the first volume wall and the second volume wall shown and described in regard to FIG. 1.3.1-FIG. 1.3.2. The piston bodies C700 may generally define cylinders into which pistons A1011 of the piston assembly A1010 are each positioned such as to define the expansion chamber A221 and the compression chamber A222 within each piston body C700. However, it should be appreciated that other suitable geometries of the piston body C700 containing the piston A1011 may be utilized.

The engine A100 further includes a plurality of walled conduits A1050 connecting particular chambers A221, A222 of each piston body C700 (FIG. 1.3.1) such as to define a balanced pressure arrangement of the pistons A1011. In various embodiments, the engine A100 includes at least one interconnected volume of chambers A221, A222 such as described herein. In one embodiment, such as depicted in regard to FIGS. 1.7.1-FIG. 1.7.4, the engine A100 includes two interconnected volumes in which each interconnected volume includes an expansion chamber A221 of a first piston body C700 of a first piston assembly A1010 connected in fluid communication of the engine working fluid with a compression chamber A222 of a second piston body C700 of a second piston assembly A1010 each connected by a conduit A1050. More particularly, the balanced pressure arrangement of piston assemblies A1010 depicted in regard to FIGS. 1.7.1-FIG. 1.7.4 includes two interconnected volumes each substantially fluidly separated from one another and/or substantially pneumatically separated from one another. The fluidly separated and/or pneumatically separated arrangement of chambers A221, A222 into the interconnected volume, and those chambers A221, A222 outside of the interconnected volume or in another interconnected volume, is particularly provided via the arrangement of expansion chambers A221 connected to compression chambers A222 via the walled conduits A1050 such as further described herein.

In various embodiments, the interconnected volume includes pairs of the expansion chamber A221 fluidly coupled to the compression chamber A222 each defined at laterally separated ends of the piston assemblies A1010. In one embodiment, the engine A100 defines a first end 101 separated along the lateral direction L by the connection member A1030 from a second end 102, such as depicted in FIG. 1.7.2 and FIG. 1.7.3. Each end of the engine A100 defines an expansion chamber A221 and a compression chamber A222 at each piston A1011 of each piston assembly A1010. The engine A100 depicted in FIGS. 1.7.1-FIG. 1.7.4, and further in regard to FIG. 1.3.1, includes the expansion chamber A221 at one end connected to a respective compression chamber A222 at another end via respective conduits. In one embodiment, such as depicted in FIGS. 1.7.2 and 1.7.3, the engine A100 includes two expansion chambers A221 at the first end 101 each connected to respective compression chambers A222 at the second end 102 via respective conduits A1050. The engine A100 further includes two expansion chambers A221 at the second end 102 each connected to respective compression chamber A222 at the first end 101 via respective conduits A1050. The system A10 further includes four expansion chambers A221 at one end each connected to respective compression chambers A222 at the same end via respective conduits A1050. In one embodiment, the system A10 includes two expansion chambers A221 at the first end 101 each connected to respective compression chambers A222 at the first end 101 via respective walled conduits A1050. The system A10 further includes two expansion chambers A221 at the second end 102 each connected to respective compression chambers A222 at the second end 102 via respective walled conduits A1050.

To provide a balanced pressure arrangement of piston assemblies A1010, one interconnected volume includes a pair of the expansion chamber A221 at one end (e.g., the first end 101 or the second end 102) connected to the compression chamber A222 at the other or opposite end. In one embodiment, the expansion chamber A221 at the first end 101 is fluidly connected to the compression chamber A222 at the second end 102. In another embodiment, the expansion chamber A221 at the second end 102 is fluidly connected to the compression chamber A222 at the first end 101. The interconnected volume further includes a pair of expansion chambers A221 at the first end 101 or the second end 102 connected to a respective compression chamber A222 at the same end, opposing ends, or both, relative to the expansion chamber A221. In one embodiment, the expansion chamber A221 at the first end 101 is fluidly connected to the compression chamber A222 at the same end (i.e., the first end 101). In another embodiment, the expansion chamber A221 at the second end 102 is fluid connected to the compression chamber A222 at the same end (i.e., the second end 102). In yet another embodiment, the expansion chamber A221 at the first end 101 is fluidly connected to the compression chamber A222 at the second end 102 (i.e., the opposing end). In still yet another embodiment, the expansion chamber A221 at the second end 102 is fluidly connected to the compression chamber at the first end 101 (i.e., the opposing end). It should be appreciated that the arrangement described herein includes each expansion chamber A221 of one piston body C700 of one piston assembly A1010 connected to a respective compression chamber A222 of another, different piston body C700 of another, different piston assembly A1010. It should further be appreciated that, in various embodiments, the expansion chamber A221 of one piston body C700 and one piston assembly C1010 is exclusively fluidly connected to the compression chamber A222 of another piston body C700 of another piston assembly C1010 (i.e., each walled conduit A1050 fluidly connects only one expansion chamber A221 to only one compression chamber A222).

The balanced pressure arrangement of piston assemblies A1010 described herein is such that a uniform temperature applied at the expansion chambers A221 and the compression chambers A222 provides an equal pressure at the expansion chamber A221 of one piston body C700 counteracted by an equal and opposite pressure at the same piston body C700 relative to the expansion chamber A221. Stated alternatively, when a uniform temperature is applied to the expansion chambers A221 and the compression chambers A222, movement of one piston assembly A1010 defining a free piston assembly A1010 results in pressure cancellation at adjacent piston assemblies A1010 such that pressure waves will not propagate to induce movement of the adjacent piston assembly A1010.

It should be appreciated that each interconnected volume described herein includes one or more passages, chambers, openings, or other flowpaths between the arrangements of the compression chamber A222 and the expansion chamber A221 described above. For example, the particular arrangements of walled conduits A1050 providing fluid communication of the engine working fluid between the compression chamber A222 and the expansion chamber A221 such as described in regard to FIGS. 1.7.1 through 1.7.4 further includes the chiller conduits A54, collection chambers A62, A64, heater conduits C110, etc. such as shown and described in regard to FIG. 1.4.1 through FIG. 1.5.1. Additionally, or alternatively, the particular arrangements of walled conduits A1050 providing fluid communication between the compression chamber A222 and the expansion chamber A221 such as described in regard to FIG. 1.7.1 through FIG. 1.7.2 may further include a heat exchanger or regenerator, or features thereof, such as shown and described in regard to FIG. 1.6.1.

Although depicted as a balanced pressure arrangement of four piston assemblies A1010 at eight piston bodies C700 defining eight fluidly connected pairs of expansion chambers A221 and compression chambers A222, it should be appreciated that the engine A100 generally includes an interconnected volume such as described above. As such, other embodiments of the engine A100 may include a quantity of two or more piston assemblies A1010 in which the arrangements of the piston assembly A1010 are scaled accordingly based on the arrangement described above such as to provide at least one interconnected volume of chambers A221, A222 and conduits 1050.

In various embodiments, the system A10 defines the reference longitudinal axis C204 extended co-directional to the lateral direction L or generally along a direction along which the pistons A1011 articulate within the chambers A221, A222. The chambers A221, A222 are positioned in circumferential arrangement relative to the reference longitudinal axis C204. Each chamber 221, 222 is extended along the lateral direction L or otherwise co-directional to the reference longitudinal axis C204.

In one embodiment, the engine includes four piston assemblies A1010 extended along the lateral direction L and in circumferential arrangement relative to the reference longitudinal axis C204. The piston assemblies A1010 may be positioned equidistant to one another around the reference longitudinal axis C204. In one embodiment, a pair of the heater body is positioned at outer ends A103 of the engine. The heater body is positioned proximate to the expansion chamber A221 and distal to the compression chamber A222. Each heater body may be positioned and configured to provide a substantially even flow of thermal energy to four hot side heat exchangers 160 or expansion chambers A221 at a time.

In other embodiments, the engine A100 includes two or more piston assemblies A1010 in side-by-side arrangement. The piston assemblies A1010 may be positioned equidistant relative to one another. In still various embodiments, a single heater body C100 may be positioned relative to each hot side heat exchanger or working fluid body C108. It should be appreciated that various embodiments of the system A10 provided herein may include any quantity of heater bodies positioned at any quantity of expansion chambers A221 as desired. It should be appreciated that other arrangements may be utilized as desired such as to provide thermal energy to the expansion chambers A221. In still various embodiments, other arrangements may be utilized such as to provide selective or independent operability of a plurality of heater bodies C100. For example, selective or independent operability of the plurality of heater bodies C100 may desirably control a temperature, flow rate, or other property of thermal energy, or particularly the heating working fluid, provided in thermal communication to the working fluid body C108. Selective operability may further include selective on/off operation of one or more heater bodies C100 independent of one another.

It should further be appreciated that although the piston assemblies A1010 of the engine A100 are depicted in straight, flat, inline, or horizontally opposed arrangements, the piston assemblies A1010 and heater bodies C100 may alternatively be arranged in V-, W-, radial, or circumferential arrangements, or other suitable piston assembly A1010 arrangements. For example, one or more embodiments of the system A10 may include a center and/or outer heater body C100 around which the plurality of piston assemblies A1010 is positioned.

In general, the exemplary embodiments of system A10 and engine, or portions thereof, described herein may be manufactured or formed using any suitable process. However, in accordance with several aspects of the present subject matter, some or all of system A10 may be formed using an additive manufacturing process, such as a 3-D printing process. The use of such a process may allow portions of the system A10 to be formed integrally, as a single monolithic component, or as any suitable number of sub-components. In various embodiments, the manufacturing process may allow the all or part of the heater body, the chiller assembly, the load device c092, or the engine to be integrally formed and include a variety of features not possible when using prior manufacturing methods. For example, the additive manufacturing methods described herein provide the manufacture of the system A10 having unique features, configurations, thicknesses, materials, densities, and structures not possible using prior manufacturing methods. Some of these novel features can, for example, improve thermal energy transfer between two or more components, improve thermal energy transfer to the engine working fluid, improve thermal energy transfer from the engine working fluid to the chiller working fluid, reduce leakages, or facilitate assembly, or generally improve thermal efficiency, power generation and output, or power density of the system A10 using an additive manufacturing process as described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as providing fabrication of complex objects by building objects point-by-point, layer-by-layer, typically in a vertical direction, other methods of fabrication are possible and are within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes. As another example, embodiments of the present disclosure may include selectively depositing a binder material to chemically bind portions of the layers of powder together to form a green body article. After curing, the green body article may be pre-sintered to form a brown body article having substantially all of the binder removed, and fully sintered to form a consolidated article.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Laser Sintering (DLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Laser Melting (DLM), Direct Selective Laser Melting (DSLM), Selective Laser Melting (SLM), Direct Metal Laser Melting (DMLM), Binder Jetting (BJ), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" or "binding" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process, or additionally with a binder process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, a decreased porosity decreasing and/or an increased density (e.g., via hot isostatic pressing), and other component properties or features.

It should be appreciated that one skilled in the art may add or modify features shown and described herein to facilitate manufacture of the system A10 provided herein without undue experimentation. For example, build features, such as trusses, grids, build surfaces, or other supporting features, or material or fluid ingress or egress ports, may be added or modified from the present geometries to facilitate manufacture of embodiments of the system A10 based at least on a desired manufacturing process or a desired particular additive manufacturing process.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While certain embodiments of the present disclosure may not be limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process, reduce potential leakage, reduce thermodynamic losses, improve thermal energy transfer, or provide higher power densities. For example, the integral formation reduces the number of separate parts that must be assembled, thus reducing associated time, overall assembly costs, reduces potential leakage pathways, or reduces potential thermodynamic losses. Additionally, existing issues with, for example, leakage, may advantageously be reduced. Still further, joint quality between separate parts may be addressed or obviated by the processes described herein, such as to desirably reduce leakage, assembly, and improve overall performance.

Also, the additive manufacturing methods described above provide much more complex and intricate shapes and contours of the components described herein to be formed with a very high level of precision. For example, such components may include thin additively manufactured layers, cross sectional features, and component contours. As another example, additive manufacturing may provide heat exchanger surface areas, volumes, passages, conduits, or other features that may desirably improve heat exchanger efficiency or performance, or overall engine or system performance. In addition, the additive manufacturing process provides the manufacture of a single component having different materials such that different portions of the component may exhibit different performance characteristics. The successive, additive steps of the manufacturing process provide the construction of these novel features. As a result, the components described herein may exhibit improved functionality and reliability.

Closed-cycle engine arrangements, such as Stirling engines, generally define a ratio of power output in Watts to a product of mean average engine working fluid pressure in Pascals, swept volume of the engine working fluid in cubic meters, and engine cycle frequency in Hertz (i.e., operating frequency of a piston assembly), otherwise referred to as a Beale number. A maximum operating Beale number for Stirling engines, depending on operating temperature and engine performance, generally ranges between 0.05 and 0.15. Referring to certain embodiments of the system A10 shown and described herein, features, arrangements, ratios, or methods of manufacture and assembly shown and described herein provide the engine A100 to define a first operating parameter in which the first operating parameter defines a maximum operational Beale number greater than or equal to 0.10. In another embodiment, the engine A100 defines a maximum operational Beale number greater than 0.15. In still another embodiment, the engine A100 defines a maximum operational Beale number greater than 0.20. In yet another embodiment, the engine A100 defines a maximum operational Beale number greater than 0.23. In various embodiments, the engine A100 defines a maximum operational Beale number less than or equal to 0.35. In still various embodiments, the engine A100 defines a maximum operational Beale number less than 0.30. In one embodiment, embodiments of the engine A100 shown and described herein define a maximum operational Beale number between 0.10 and 0.35, inclusive. In still various embodiments, the engine A100 defines a maximum operational Beale number between 0.15 and 0.30.

Embodiments of the system A10 and engine A100 provided herein provide greater Beale numbers via one or more of the features, arrangements, ratios, or methods of manufacture and assembly provided herein. Greater Beale numbers are provided at least in part via lower average engine working fluid pressure, lower engine cycle frequency of the piston assemblies A1010, or lower swept volume of the engine working fluid between fluidly connected chambers A221, A222, or combinations thereof, relative to the power output from the piston assembly A1010. Exemplary embodiments of the system A10 and engine A100 provided herein may produce a mechanical power output from the piston assembly A1010 up to 100 kilowatts (kW) or more.

Embodiments of the engine A100 provided herein may provide greater Beale numbers based at least in part on the plurality of heater conduits C110 collectively defining a desired heat transferability of thermal energy from the hot side heat exchanger C108 to the engine working fluid within the plurality of heater conduits C110. In various embodiments, the system A10 defines a ratio of maximum cycle volume of the engine working fluid to a collective volume of the plurality of heater conduits. The maximum cycle volume is the maximum volume of the engine working fluid within the expansion chamber A221, the compression chamber A222, and the fluid volume connected therebetween (e.g., the expansion chamber A221 of one piston body and the compression chamber A222 of another piston body connected by the walled conduit A1050). The minimum cycle volume is the minimum volume of the engine working fluid within the expansion chamber A221, the compression chamber A222, and the fluid volume connected therebetween (e.g., the expansion chamber A221 of one piston body and the compression chamber A222 of another piston body connected by the walled conduit A1050). The difference between the maximum cycle volume and the minimum cycle volume is the swept volume. In one embodiment, the ratio of maximum cycle volume of the engine working fluid to the volume of the passages within the plurality of heater conduits is between 2.5 and 25. For example, in various embodiments, the plurality of heater conduits together contain between two-fifths and one-twenty-fifth of the volume of the total volume of engine working fluid based on the maximum cycle volume. Stated differently, between two-fifths and one-twenty-fifth of the maximum cycle volume of the engine working fluid is receiving thermal energy from the hot side heat exchanger C108 during operation of the system A10.

In still various embodiments, embodiments of the engine A100 provided herein may provide greater Beale numbers based at least in part on a ratio of surface area of the plurality of heater conduits C110 versus volume of the working fluid within the plurality of heater conduits C110. For instance, the plurality of heater conduits may provide a range of surface area collectively within the plurality of heater conduits C110 relative to the volume of the engine working fluid within the plurality of heater conduits C110. The surface area may generally define the internal area of the heater conduits in direct fluid contact with the engine working fluid. In various embodiments, the ratio of surface area of the plurality of heater conduits to volume of the working fluid within the plurality of heater conduits is between 8 and 40. For example, in various embodiments, the plurality of heater conduits together defines a unit surface area within the conduits (i.e., surface area in fluid contact with the engine working fluid) between 8 and 40 times greater than a unit volume of the plurality of heater conduits.

In various embodiments, the internal surface area of the plurality of heater conduits is defined between a first opening and a second opening of the heater conduits C110. The first opening is in direct fluid communication with the expansion chamber A221, such as depicted at the piston chamber aperture C111 in FIG. 1.5.1. The second opening is in direct fluid communication with the walled conduit C1050, such as depicted at the opening C113 in FIG. 1.5.1. In one embodiment, the second opening is in direct fluid communication with the walled conduit C1050 including the regenerator body C800 defined therewithin. In another embodiment, the surface area of the plurality of heater conduits C110 defines an internal area of the heater conduits C110 corresponding to portions of the heater conduits C110 receiving thermal energy from the heater body C100. In another embodiment, the surface area of the plurality of heater conduits C110 defines an internal area of the heater conduits C110 extending from a first opening, such as defined at the plurality of piston apertures C111 in FIG. 1.5.1, to a first or proximal fin, tab, wall, or other feature of the fin array C1016 of the regenerator body C800 at the walled conduit C1050. In still another embodiment, such as an embodiment providing direct fluid communication of the heater conduits C110 to the chiller conduits A54, the second opening, such as depicted at opening C113 in FIG. 1.5.1., is in direct fluid communication with chiller collection chamber A62 or the chiller conduits A54. In various embodiments, the second opening, such as depicted at opening C113 in FIG. 1.5.1., is in direct fluid communication with the chiller collection chamber opening A60.

Embodiments of the engine A100 provided herein may provide greater Beale numbers based at least in part on the plurality of chiller conduits A54 collectively defining a desired heat transferability of thermal energy from the engine working fluid within the plurality of chiller conduits A54 to the cold side heat exchanger A42. In various embodiments, the system A10 defines a ratio of maximum cycle volume of the engine working fluid to a collective volume of the plurality of chiller conduits A54. In one embodiment, the ratio of maximum cycle volume of the engine working fluid to the volume of the plurality of chiller conduits A54 is between 10 and 100. For example, in various embodiments, the plurality of chiller conduits A54 together contain between one-tenth and one-hundredth of the volume of the total volume of engine working fluid based on the maximum cycle volume. Stated differently, between one-tenth and one-hundredth of the maximum cycle volume of the engine working fluid is transferring thermal energy to the cold side heat exchanger A42 during operation of the system A10.

In still various embodiments, embodiments of the engine provided herein may provide greater Beale numbers based at least in part on a ratio of surface area of the plurality of chiller conduits A54 versus volume of the working fluid within the plurality of chiller conduits A54. For instance, the plurality of chiller conduits A54 may particularly provide a range of surface area collectively within the plurality of chiller conduits A54 relative to the volume of the engine working fluid within the plurality of chiller conduits A54. In various embodiments, the ratio of surface area of the plurality of chiller conduits A54 to volume of the working fluid within the plurality of chiller conduits A54 is between 7 and 40. For example, in various embodiments, the plurality of chiller conduits A54 together defines a unit surface area within the conduits (i.e., surface area in fluid contact with the engine working fluid) between 7 and 40 times greater than a unit volume of the plurality of chiller conduits A54.

In various embodiments, the surface area of the chiller conduits A54 is defined from the chiller passage opening A58 to the chiller collection chamber opening A60. In one embodiment, the surface area of the chiller conduits A54 is the internal area within the chiller conduits A54 corresponding to the portion of the chiller conduits A54 at least partially surrounded by the chiller working fluid within the chiller working fluid passage A66 in thermal communication with the engine working fluid.

Various embodiments of the system A10 and engine A100 shown and described herein provide desired power outputs, power densities, or efficiencies, or combinations thereof, based on one or more elements, arrangements, flowpaths, conduits, surface areas, volumes, or assemblies, or methods thereof, provided herein. Efficiencies described herein may include $T_{Hot,engine}$ corresponding to temperature input to the engine working fluid at the heater conduits or working fluid pathways C110 from the hot side heat exchanger C108. Still various embodiments include $T_{Cold,ambient}$ corresponding to temperature removed from the engine working fluid at the chiller conduits A54 to the cold side heat exchanger A42. In other instances, the temperature input may alternatively correspond to heat or thermal energy input to the engine working fluid, such as from the heating working fluid. Still further, the temperature removed may alternatively correspond to heat or thermal energy output from the engine working fluid, such as to the chiller working fluid. In still various embodiments, the environment is the chiller working fluid into which the engine A100 rejects, exhausts, or otherwise releases heat or thermal energy from the engine working fluid at the chiller conduits A54.

In still yet various embodiments, efficiencies described herein may include $Q_{Out}$ corresponding to thermal energy received by the engine working fluid at the heater conduits or working fluid pathways C110 from the hot side heat exchanger C108. Still various embodiments include $Q_{In}$ corresponding to thermal energy received at the chiller working fluid at the chiller working fluid passage A56 at the cold side heat exchanger A42 from the engine working fluid at the chiller conduits A54.

In still another embodiment, $E_{out}$ is the net electrical energy output from the load device C092 that is operatively coupled to the engine A100 via the piston assembly C1010.

In various embodiments, the features, arrangements, surface areas, volumes, or ratios thereof provide the engine A100 to operate at higher efficiencies over known closed cycle engines, or Stirling engines particularly. Various embodiments of the system A10 provided herein may be configured to produce mechanical power output from the piston assembly A1010 at a Carnot efficiency $\eta_{Carnot}$ of up to approximately 80%. In some embodiments, the system A10 provided herein may be configured to produce mechanical power output from the piston assembly A1010 at an efficiency of up to approximately 80% cold environments, such as in space. In one embodiment, the Carnot efficiency corresponds to the thermal efficiency of the engine A100 receiving thermal energy or heat at the heater conduits C110 and expelling thermal energy or heat from the engine working fluid at the chiller conduits A54. In one embodiment, the Carnot efficiency corresponds at least to the engine A100 including the hot side heat exchanger C108 and the cold side heat exchanger A42, such as depicted at the engine level efficiency (FIG. 1.2.1).

Various embodiments of the system A10 provided herein may be configured to produce mechanical power output from the piston assembly A1010 at electrical efficiency of up to approximately 80%. In one embodiment, the electrical efficiency corresponds to the useful work generated by the engine A100 receiving heat or thermal energy from the heating working fluid and releasing heat or thermal energy to the chiller working fluid and converted into electrical energy via the load device C092, such as depicted within area A106 in FIG. 1.2.1. In one embodiment, the electrical efficiency corresponds at least to the system A10 including the engine A100, the heater body C100, and the chiller assembly A40, such as depicted at the system level efficiency (FIG. 1.2.1).

In one embodiment, the system A10 provides a temperature differential via the heater body C100 and the chiller assembly C40 in which the engine A100 generates mechanical power output between 1 kW and 100 kW relative to the piston assembly A1010. In another embodiment, the system A10 is configured to generate between 10 kW and 100 kW. In yet another embodiment, the system A10 is configured to generate between 25 kW and 100 kW. In yet another embodiment, the system A10 may be configured to produce greater than 100 kW. For example, the system A10 may include a plurality of the engine A100 operably coupled at two or more piston assemblies A1010 and the load device c092 to produce greater than 100 kW. In various embodiments, a plurality of the engine A100 may be operably coupled to produce up to 5 megawatts.

In still various embodiments, the engine A100 further defines a second operating parameter defining a ratio of mechanical power output from the piston assembly A1010 to maximum cycle volume of the working fluid between 0.0005 and 0.0040 kW per cubic centimeter (cc) for a given efficiency. In various embodiments, the ratio of mechanical power output from the piston assembly A1010 to maximum cycle volume of the working fluid is a range of maximum ratio at which the mechanical power output from the piston assembly A1010 to maximum cycle volume of the working fluid is defined. In some embodiments, the engine A100 defines a maximum ratio of mechanical power output from the piston assembly A1010 to maximum cycle volume of the working fluid between 0.0005 and 0.0040 kW generated from the piston assembly A1010 for one cubic centimeter of engine working fluid at an engine efficiency of at least 50%. Stated differently, between 0.0005 and 0.0040 kW is generated from the piston assembly A1010 for one cubic centimeter of engine working fluid at an engine efficiency of at least 50%. In various embodiments, the engine A100 defines a ratio of mechanical power output from the piston assembly A1010 to the maximum cycle volume of the working fluid between 0.0010 and 0.0030 kW/cc at an engine efficiency of at least 50%. In another embodiment, the engine A100 defines a ratio of mechanical power output from the piston assembly A1010 to the maximum cycle volume of the working fluid between 0.0015 and 0.0025 kW/cc at an engine efficiency of at least 50%. In one embodiment, the system A10 defines the ratio of mechanical power output from the piston assembly A1010 to maximum cycle volume of the working fluid between 0.0005 kW/cc and 0.0040 kW/cc at a Carnot efficiency of the engine of up to 80%. In another embodiment, the engine A100 defines the ratio of mechanical power output from the piston assembly A1010 to maximum cycle volume of the working fluid between 0.0005 kW/cc and 0.0040 kW/cc with an efficiency of the engine A100 of up to 60%.

Various embodiments of the system A10 shown and described herein provide a power density by efficiency that may be advantageous over certain power generation or energy conversion systems including engine and heat exchanger systems. In certain embodiments, the system A10 includes a third operating parameter defining a multiplication product of power density (kW/$m^3$) and system level efficiency greater than 51. For example, the power density is power output at the load device c092 over volume of the engine working fluid at the engine A100. In particular embodiments, the system A10 includes the power density over maximum cycle volume of the engine working fluid at the engine A100. In some embodiments, the system A10 includes a power density (kW/$m^3$) by efficiency greater than 100 kilowatts over cubic meters (kW/$m^3$). In still other embodiments, the system A10 includes a power density by efficiency greater than 255 kW/$m^3$. In various embodiments, the system A10 includes a power density by efficiency less than 400 kW/$m^3$. In other embodiments, the system A10 includes a power density by efficiency less than 125 (kW/$m^3$). In still various embodiments, the system A10 includes a power density (kW/$m^3$) by efficiency between 51 and 400 kW/$m^3$.

In still various embodiments, the engine A100 includes a fourth operating parameter at which one or more of the efficiencies and ratio of mechanical power output from the piston assembly A1010 to maximum cycle volume of the engine working fluid relative to a temperature differential of the engine working fluid at the expansion chamber A221 and the compression chamber A222. In one embodiment, the fourth operating parameter defines the temperature differential of the engine working fluid at the expansion chamber A221 an the compression chamber A222 of at least 630 degrees Celsius. In one embodiment, the cold side heat exchanger A42 is configured to reduce the temperature of the engine working fluid at the chiller conduits A54 and/or compression chamber A222 less than 120 degrees Celsius. In another embodiment, the cold side heat exchanger A42 is configured to reduce the temperature of the engine working fluid at the chiller conduits A54 or compression chamber A222 to between approximately −20 degrees Celsius and approximately 120 degrees Celsius on average during steady-state full power operation. In still another embodiment, the cold side heat exchanger A42 is configured to reduce the temperature of the engine working fluid at the chiller conduits A54 or compression chamber A222 to between 20 degrees Celsius and approximately 120 degrees Celsius on average during steady-state full power operation. In yet another embodiment, the hot side heat exchanger C108 is configured to heat the engine working fluid at the heater conduits C110 or expansion chamber A221 to at least 750 degrees Celsius. However, it should be appreciated that an upper limit of the heat provided to the hot side heat exchanger C108 or the expansion chamber A221 is based at least on materials limits, such as one or materials listed or described herein, or another suitable material for constructing the engine and/or system. Material limits may include, but are not limited to, a melting point, tensile stress, yield stress, deformation or deflection limits, or desired life or durability of the engine.

It should be appreciated that performances, power outputs, efficiencies, or temperature differentials at the system A10, the engine A100, or both, provided herein may be based on a “Sea Level Static” or “Standard Day” input air condition such as defined by the United States National Aeronautics and Space Administration, unless otherwise specified. For example, unless otherwise specified, conditions provided to the heater body, the chiller assembly, or both, or any subsystems, components, etc. therein, or any other portions of the system A10 receiving an input fluid, such as air, are based on Standard Day conditions.

The heat transfer relationships described herein may include thermal communication by conduction and/or convection. A heat transfer relationship may include a thermally conductive relationship that provides heat transfer through conduction (e.g., heat diffusion) between solid bodies and/or between a solid body and a fluid. Additionally, or in the alternative, a heat transfer relationship may include a thermally convective relationship that provides heat transfer through convection (e.g., heat transfer by bulk fluid flow) between a fluid and a solid body. It will be appreciated that convection generally includes a combination of a conduction (e.g., heat diffusion) and advection (e.g., heat transfer by bulk fluid flow). As used herein, reference to a thermally conductive relationship may include conduction and/or convection; whereas reference to a thermally convective relationship includes at least some convection.

A thermally conductive relationship may include thermal communication by conduction between a first solid body and a second solid body, between a first fluid and a first solid body, between the first solid body and a second fluid, and/or between the second solid body and a second fluid. For example, such conduction may provide heat transfer from a first fluid to a first solid body and/or from the first solid body to a second fluid. Additionally, or in the alternative, such conduction may provide heat transfer from a first fluid to a first solid body and/or through a first solid body (e.g., from one surface to another) and/or from the first solid body to a second solid body and/or through a second solid body (e.g., from one surface to another) and/or from the second solid body to a second fluid.

A thermally convective relationship may include thermal communication by convection (e.g., heat transfer by bulk fluid flow) between a first fluid and a first solid body, between the first solid body and a second fluid, and/or between a second solid body and a second fluid. For example, such convection may provide heat transfer from a first fluid to a first solid body and/or from the first solid body to a second fluid. Additionally, or in the alternative, such convection may provide heat transfer from a second solid body to a second fluid.

It will be appreciated that the terms “clockwise” and “counter-clockwise” are terms of convenience and are not to be limiting. Generally, the terms “clock-wise” and “counter-clockwise” have their ordinary meaning, and unless otherwise indicated refer to a direction with reference to a top-down or upright view. Clockwise and counter-clockwise elements may be interchanged without departing from the scope of the present disclosure.

Where temperatures, pressures, loads, phases, etc. are said to be substantially similar or uniform, it should be appreciated that it is understood that variations, leakages, or other minor differences in inputs or outputs may exist such that the differences may be considered negligible by one skilled in the art. Additionally, or alternatively, where temperatures or pressures are said to be uniform, i.e., a substantially uniform unit (e.g., a substantially uniform temperature at the plurality of chambers A221), it should be appreciated that in one embodiment, the substantially uniform unit is relative to an average operating condition, such as a phase of operation of the engine, or thermal energy flow from one fluid to another fluid, or from one surface to a fluid, or from one surface to another surface, or from one fluid to another surface, etc. For example, where a substantially uniform temperature is provided or removed to/from the plurality of chambers A221, A222, the temperature is relative to an average temperature over a phase of operation of the engine. As another example, where a substantially uniform thermal energy unit is provided or removed to/from the plurality of chambers A221, A222, the uniform thermal energy unit is relative to an average thermal energy supply from one fluid to another fluid relative to the structure, or plurality of structures, through which thermal energy transferred.

Various interfaces, such as mating surfaces, interfaces, points, flanges, etc. at which one or more monolithic bodies, or portions thereof, attach, couple, connect, or otherwise mate, may define or include seal interfaces, such as, but not limited to, labyrinth seals, grooves into which a seal is placed, crush seals, gaskets, vulcanizing silicone, etc., or other appropriate seal or sealing substance. Additionally, or alternatively, one or more of such interfaces may be coupled together via mechanical fasteners, such as, but not limited to, nuts, bolts, screws, tie rods, clamps, etc. In still additional or alternative embodiments, one or more of such interfaces may be coupled together via a joining or bonding processes, such as, but not limited to, welding, soldering, brazing, etc., or other appropriate joining process.

It should be appreciated that ratios, ranges, minimums, maximums, or limits generally, or combinations thereof, may provide structure with benefits not previously known in the art. As such, values below certain minimums described herein, or values above certain maximums described herein, may alter the function and/or structure of one or more components, features, or elements described herein. For example, ratios of volumes, surface area to volume, power output to volume, etc. below the ranges described herein may be insufficient for desired thermal energy transfer, such as to undesirably limit power output, efficiency, or Beale number. As another example, limits greater than those described herein may undesirably increase the size, dimensions, weight, or overall packaging of the system or engine, such as to undesirably limit the applications, apparatuses, vehicles, usability, utility, etc. in which the system or engine may be applied or operated. Still further, or alternatively, undesired increases in overall packaging may undesirably decrease efficiency of an overall system, application, apparatus, vehicle, etc. into which the engine may be installed, utilized, or otherwise operated. For example, although an engine may be constructed defining a similar or greater efficiency as described herein, such an engine may be of undesirable size, dimension, weight, or overall packaging such as to reduce an efficiency of the system into which the engine is installed. As such, obviation or transgression of one or more limits described herein, such as one or limits relative to features such as, but not limited to, heater conduits, chiller conduits A54, chamber volumes, walled conduit volumes, or operational temperatures, or combinations thereof, may undesirably alter such structures such as to change the function of the system or engine.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the presently disclosed subject matter, including the best mode, and also to provide any person skilled in the art to practice the subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy conversion system, comprising:

a closed cycle engine comprising a regenerator having a regenerator body, a piston assembly comprising a first piston, a first piston body defining a first piston chamber, a second piston, and a second piston body defining a second piston chamber, the first piston disposed within the first piston chamber, the second piston disposed within the second piston chamber;

wherein the closed cycle engine is oriented along a lateral axis, wherein the first piston body defines a first distal portion of the closed cycle engine and the second piston body defines a second distal portion of the closed cycle engine, the first distal portion and the second distal portion disposed at opposite regions of the lateral axis; and wherein the closed cycle engine comprises at least one of:

a first plurality of working-fluid pathways providing fluid communication between the first piston chamber at the first piston body and the second piston chamber at the second piston body; or a second plurality of working-fluid pathways providing fluid communication between the second piston chamber at the second piston body and the first piston chamber at the first piston body; and wherein the first plurality of working-fluid pathways and/or the second plurality of working-fluid pathways include: i) a plurality of hot-side working fluid pathways providing fluid communication between a plurality of first piston chamber apertures of the first piston chamber containing the first piston and a plurality of regenerator apertures of the regenerator body of the regenerator; and ii) a plurality of cold-side working fluid pathways providing fluid communication between a second plurality of regenerator apertures of the regenerator body and a plurality of second piston chamber apertures of the second piston chamber containing the second piston, wherein the regenerator body defines a hot-side portion comprising a hot-side regenerator conduit and a hot-side plurality of fin arrays adjacently disposed within the hot-side regenerator conduit and a cold-side portion comprising a cold-side regenerator conduit and a cold-side plurality of fin arrays adjacently disposed within the cold-side regenerator conduit, the hot-side regenerator conduit and the hot-side plurality of fin arrays being longitudinally separated from the cold-side regenerator conduit and the cold-side plurality of fin arrays by a hot-to-cold gap to provide at least two thermally distinct thermal storage bodies within the regenerator body, the hot-to-cold gap being larger than gaps between individual fin arrays in each of the hot-side plurality of fin arrays and the cold-side plurality of fin arrays.

2. The energy conversion system of claim 1, wherein the piston assembly comprises a connection member coupled to the first piston and the second piston at respectively opposite ends of the connection member.

3. The energy conversion system of claim 2, wherein the closed cycle engine comprises:

a load device operably coupled to the piston assembly, the load device disposed between the first piston body and the second piston body, wherein the load device defines a proximal portion of the closed cycle engine in relation to the lateral axis.

4. The energy conversion system of claim 3, wherein the piston assembly comprises a dynamic member, wherein the load device comprises a machine body and a stator assembly housed by the machine body, the machine body disposed laterally between the first piston and the second piston, and wherein the stator assembly at least partially surrounds the dynamic member.

5. The energy conversion system of claim 2, wherein the first piston chamber comprises a first expansion chamber and a first compression chamber, wherein the first piston separates the first expansion chamber from the first compression chamber, and wherein the second piston chamber comprises a second expansion chamber and a second compression chamber, wherein the second piston separates the second expansion chamber from the second compression chamber.

6. The energy conversion system of claim 5, wherein the first plurality of working-fluid pathways provide fluid communication between the first expansion chamber and the second compression chamber; or wherein the second plurality of working-fluid pathways provide fluid communication between the second expansion chamber and the first compression chamber.

7. The energy conversion system of claim 5, wherein the first piston body comprises a first dome structure defining a portion of the first expansion chamber, and wherein the second piston body comprises a second dome structure defining a portion of the second expansion chamber; and wherein the first piston has a rounded shape corresponding to the first dome structure, and wherein the second piston has a rounded shape corresponding to the second dome structure.

8. The energy conversion system of claim 5, comprising at least one of:

a first heater body disposed in proximity to the first piston body, wherein the first plurality of working-fluid pathways are in thermal communication with the first heater body; or a second heater body disposed in proximity to the second piston body, wherein the second plurality of working-fluid pathways are in thermal communication with the second heater body.

9. The energy conversion system of claim 8, wherein at least a portion of the first heater body is disposed laterally distal to the first piston body in relation to the lateral axis, and wherein at least a portion of the second heater body is disposed laterally distal to the second piston body in relation to the lateral axis.

10. The energy conversion system of claim 8, wherein the first heater body is disposed proximal to the first expansion chamber and distal to the first compression chamber, and wherein the second heater body is disposed proximal to the second expansion chamber and distal to the second compression chamber.

11. The energy conversion system of claim 1, wherein the piston assembly is a free piston assembly.

12. The energy conversion system of claim 1, wherein the first piston body defines an additional first piston chamber and the second piston body defines an additional second piston chamber;

wherein the first piston chamber comprises a first expansion chamber and a first compression chamber, and wherein the second piston chamber comprises a second expansion chamber and a second compression chamber;

wherein the additional first piston chamber comprises an additional first expansion chamber and an additional first compression chamber, and wherein the additional second piston chamber comprises an additional second expansion chamber and an additional second compression chamber.

13. The energy conversion system of claim 12, wherein the first plurality of working-fluid pathways provide fluid communication between the first expansion chamber at the first piston body and the second piston chamber at the second piston body, and wherein the closed-cycle engine further comprises:

an additional first plurality of working-fluid pathways providing fluid communication between the additional first piston chamber at the first piston body and the additional second expansion chamber at the second piston body.

14. The energy conversion system of claim 13, comprising:

a first heater body disposed in proximity to the first piston body, wherein the first plurality of working-fluid pathways and the additional first plurality of working-fluid pathways are in thermal communication with the first heater body; and a first cold side heat exchanger, wherein the first plurality of working-fluid pathways and the additional first plurality of working-fluid pathways are in thermal communication with the first cold side heat exchanger.

15. The energy conversion system of claim 12, wherein the second plurality of working-fluid pathways provide fluid communication between the second compression chamber at the second piston body and the first piston chamber at the first piston body, and wherein the closed-cycle engine further comprises:

an additional second plurality of working-fluid pathways that provide fluid communication between the additional second piston chamber at the second piston body and the additional first compression chamber at the first piston body.

16. The energy conversion system of claim 15, comprising:

a second heater body disposed in proximity to the second piston body, wherein the second plurality of working-fluid pathways and the additional second plurality of working-fluid pathways are in thermal communication with the second heater body; and a second cold side heat exchanger, wherein the second plurality of working-fluid pathways and the additional second plurality of working-fluid pathways are in thermal communication with the second cold side heat exchanger.

17. The energy conversion system of claim 1, wherein the first piston body defines a plurality of first piston chambers, the second piston body defines a plurality of second piston chambers, and wherein the closed cycle engine comprises a plurality of piston assemblies, respective ones of the plurality of piston assemblies comprising a respective first piston disposed within a respective one of the plurality of first piston chambers, a respective second piston disposed within a respective one of the plurality of second piston chambers, and a respective connection member coupled to the respective first piston and the respective second piston at respectively opposite ends of the respective connection member;

wherein the plurality of first piston chambers are disposed in circumferential arrangement about the first piston body relative to the lateral axis of the closed cycle engine, and wherein the plurality of second piston chambers are disposed in circumferential arrangement about the second piston body relative to the lateral axis of the closed cycle engine.

18. The energy conversion system of claim 17, wherein the plurality of first piston chambers, respectively, comprise a first expansion chamber and a first compression chamber, and wherein the plurality of second piston chambers, respectively, comprise a second expansion chamber and a second compression chamber.

19. The energy conversion system of claim 1, wherein the first plurality of working-fluid pathways extend between respective first ends and second ends, the first ends being defined by respective ones of a plurality of piston chamber apertures defined at a dome structure of the first piston body and the second ends being defined by respective ones of a plurality of piston chamber apertures defined at a planar structure of the second piston body.

* * * * *